United States Patent
Sanderson et al.

(10) Patent No.: US 11,210,318 B1
(45) Date of Patent: Dec. 28, 2021

(54) PARTITIONED DISTRIBUTED DATABASE SYSTEMS, DEVICES, AND METHODS

(71) Applicant: VAST.COM, INC., Austin, TX (US)

(72) Inventors: Graham Carlos Sanderson, Austin, TX (US); Benedict John Elliott Smith, London (GB)

(73) Assignee: VAST.COM, INC., Austin, TX (US)

( * ) Notice: Subject to any disclaimer, the term of this patent is extended or adjusted under 35 U.S.C. 154(b) by 342 days.

(21) Appl. No.: 16/277,803

(22) Filed: Feb. 15, 2019

Related U.S. Application Data

(63) Continuation of application No. 16/158,189, filed on Oct. 11, 2018, now Pat. No. 10,268,704.

(60) Provisional application No. 62/571,691, filed on Oct. 12, 2017.

(51) Int. Cl.
   G06F 16/27 (2019.01)
   G06F 16/2458 (2019.01)
   G06F 16/22 (2019.01)
   G06F 16/25 (2019.01)
   G06F 16/242 (2019.01)

(52) U.S. Cl.
   CPC ............ *G06F 16/27* (2019.01); *G06F 16/221* (2019.01); *G06F 16/2428* (2019.01); *G06F 16/2471* (2019.01); *G06F 16/252* (2019.01); *G06F 16/278* (2019.01)

(58) Field of Classification Search
   CPC .... G06F 16/27; G06F 16/2471; G06F 16/221; G06F 16/278; G06F 16/252
   USPC ........................................................ 707/736
   See application file for complete search history.

(56) References Cited

U.S. PATENT DOCUMENTS

| | | |
|---|---|---|
| 5,459,656 A | 10/1995 | Fields |
| 5,687,322 A | 11/1997 | Deaton et al. |
| 6,026,388 A | 2/2000 | Liddy et al. |
| 6,029,195 A | 2/2000 | Herz |
| 6,266,649 B1 | 7/2001 | Linden |
| 6,430,539 B1 | 8/2002 | Lazarus et al. |
| 6,510,406 B1 | 1/2003 | Marchisio |
| 6,539,392 B1 | 3/2003 | Rebane |
| 6,611,726 B1 | 8/2003 | Crosswhite |
| 6,711,581 B2 | 3/2004 | Rebane |
| 6,751,600 B1 | 6/2004 | Wolin |
| 6,751,614 B1 | 6/2004 | Rao |
| 6,775,664 B2 | 8/2004 | Lang et al. |
| 6,873,983 B2 | 3/2005 | Ugai et al. |
| 6,886,005 B2 | 4/2005 | Davis |
| 7,013,005 B2 | 3/2006 | Yacoub et al. |
| 7,069,258 B1 | 6/2006 | Bothwell |
| 7,165,119 B2 | 1/2007 | Fish |
| 7,167,871 B2 | 1/2007 | Farahat et al. |

(Continued)

OTHER PUBLICATIONS

Persaud et al., "Innovative mobile marketing via smartphones: Are consumers ready?", Article in Marketing Intelligence & Planning, Jun. 2012.

*Primary Examiner* — Joshua Bullock
(74) *Attorney, Agent, or Firm* — Knobbe, Martens, Olson & Bear, LLP

(57) ABSTRACT

A client system can improve processing speeds by executing queries locally. A remote database can have a partitioned, columnar database. Queries from the client can be executed on the remote database, and blocks of a partition of the partitioned, columnar database can be sent to the client. Once the client has enough blocks to form the partition, the client can execute queries that reference the partition. The queries can be executed using templates for specialized expression evaluators.

20 Claims, 11 Drawing Sheets

(56) References Cited

U.S. PATENT DOCUMENTS

| | | | |
|---|---|---|---|
| 7,206,780 | B2 | 4/2007 | Slackman |
| 7,225,107 | B2 | 5/2007 | Buxton et al. |
| 7,243,102 | B1 | 7/2007 | Naam et al. |
| 7,260,568 | B2 | 8/2007 | Zhang et al. |
| 7,283,951 | B2 | 10/2007 | Marchisio et al. |
| 7,293,017 | B2 | 11/2007 | Hurst-Hiller et al. |
| 7,356,430 | B2 | 4/2008 | Miguelanez et al. |
| 7,395,170 | B2 | 7/2008 | Scott et al. |
| 7,398,201 | B2 | 7/2008 | Marchisio et al. |
| 7,433,885 | B2 | 10/2008 | Jones |
| 7,440,955 | B2 | 10/2008 | Khandelwal et al. |
| 7,444,308 | B2 | 10/2008 | Guyon et al. |
| 7,467,232 | B2 | 12/2008 | Fish et al. |
| 7,509,321 | B2 | 3/2009 | Wong et al. |
| 7,523,047 | B1 | 4/2009 | Neal et al. |
| 7,542,947 | B2 | 6/2009 | Guyon et al. |
| 7,565,362 | B2 | 7/2009 | Brill et al. |
| 7,593,904 | B1 | 9/2009 | Kirshenbaum et al. |
| 7,593,934 | B2 | 9/2009 | Li et al. |
| 7,596,552 | B2 | 9/2009 | Levy et al. |
| 7,603,348 | B2 | 10/2009 | He et al. |
| 7,631,008 | B2 | 12/2009 | Carson et al. |
| 7,636,715 | B2 | 12/2009 | Kalleh |
| 7,647,314 | B2 | 1/2010 | Sun et al. |
| 7,657,493 | B2 | 2/2010 | Meijer et al. |
| 7,660,581 | B2 | 2/2010 | Ramer et al. |
| 7,664,746 | B2 | 2/2010 | Majumder |
| 7,672,865 | B2 | 3/2010 | Kumar et al. |
| 7,680,835 | B2 | 3/2010 | MacLaurin et al. |
| 7,685,197 | B2 | 3/2010 | Fain et al. |
| 7,693,818 | B2 | 4/2010 | Majumder |
| 7,693,901 | B2 | 4/2010 | Ka et al. |
| 7,716,202 | B2 | 5/2010 | Slackman |
| 7,716,217 | B2 | 5/2010 | Marston et al. |
| 7,716,225 | B1 | 5/2010 | Dean et al. |
| 7,716,226 | B2 | 5/2010 | Barney |
| 7,725,307 | B2 | 5/2010 | Bennett |
| 7,725,451 | B2 | 5/2010 | Jing et al. |
| 7,739,408 | B2 | 6/2010 | Fish et al. |
| 7,761,447 | B2 | 7/2010 | Brill et al. |
| 7,788,252 | B2 | 8/2010 | Delli Santi et al. |
| 7,801,358 | B2 | 9/2010 | Furmaniak et al. |
| 7,801,843 | B2 | 9/2010 | Kumar et al. |
| 7,802,197 | B2 | 9/2010 | Lew et al. |
| 7,805,331 | B2 | 9/2010 | Demir et al. |
| 7,805,385 | B2 | 9/2010 | Steck et al. |
| 7,805,438 | B2 | 9/2010 | Liu et al. |
| 7,809,740 | B2 | 10/2010 | Chung et al. |
| 7,818,186 | B2 | 10/2010 | Bonissone et al. |
| 7,827,060 | B2 | 11/2010 | Wright et al. |
| 7,827,170 | B1 | 11/2010 | Horling et al. |
| 7,831,463 | B2 | 11/2010 | Nagar |
| 7,836,057 | B1 | 11/2010 | Micaelian et al. |
| 7,849,030 | B2 | 12/2010 | Ellingsworth |
| 7,860,871 | B2 | 12/2010 | Ramer et al. |
| 7,865,187 | B2 | 1/2011 | Ramer et al. |
| 7,865,418 | B2 | 1/2011 | Uenohara et al. |
| 7,870,017 | B2 | 1/2011 | Kamath |
| 7,895,193 | B2 | 2/2011 | Cucerzan et al. |
| 7,899,455 | B2 | 3/2011 | Ramer et al. |
| 7,904,448 | B2 | 3/2011 | Chung et al. |
| 7,908,238 | B1 | 3/2011 | Nolet et al. |
| 7,912,458 | B2 | 3/2011 | Ramer et al. |
| 7,912,713 | B2 | 3/2011 | Vair et al. |
| 7,921,068 | B2 | 4/2011 | Guyon et al. |
| 7,921,069 | B2 | 4/2011 | Canny et al. |
| 7,930,197 | B2 | 4/2011 | Ozzie et al. |
| 7,933,388 | B1 | 4/2011 | Vanier et al. |
| 7,937,345 | B2 | 5/2011 | Schmidtler et al. |
| 7,941,329 | B2 | 5/2011 | Kenedy et al. |
| 7,958,067 | B2 | 6/2011 | Schmidtler et al. |
| 7,966,219 | B1 | 6/2011 | Singh et al. |
| 7,987,261 | B2 | 7/2011 | Gamble |
| 8,001,121 | B2 | 8/2011 | Wang et al. |
| 8,005,643 | B2 | 8/2011 | Tunkelang et al. |
| 8,005,684 | B1 | 8/2011 | Cheng et al. |
| 8,005,774 | B2 | 8/2011 | Chapelle |
| 8,005,826 | B1 | 8/2011 | Sahami et al. |
| 8,015,065 | B2 | 9/2011 | Davies |
| 8,024,327 | B2 | 9/2011 | Tunkelang et al. |
| 8,024,349 | B1 | 9/2011 | Shao et al. |
| 8,027,864 | B2 | 9/2011 | Gilbert |
| 8,027,865 | B2 | 9/2011 | Gilbert |
| 8,032,405 | B2 | 10/2011 | Gilbert |
| 8,051,033 | B2 | 11/2011 | Kenedy et al. |
| 8,051,073 | B2 | 11/2011 | Tunkelang et al. |
| 8,065,184 | B2 | 11/2011 | Wright et al. |
| 8,065,254 | B1 | 11/2011 | Das et al. |
| 8,069,055 | B2 | 11/2011 | Keen |
| 8,078,606 | B2 | 12/2011 | Slackman |
| 8,095,523 | B2 | 1/2012 | Brave et al. |
| 8,099,376 | B2 | 1/2012 | Serrano-Morales et al. |
| 8,126,881 | B1 | 2/2012 | Sethi et al. |
| 8,326,845 | B2 | 12/2012 | Sethi et al. |
| 8,375,037 | B2 | 2/2013 | Sethi et al. |
| 8,600,823 | B1 | 12/2013 | Raines et al. |
| 8,620,717 | B1 | 12/2013 | Micaelian et al. |
| 8,645,844 | B1 | 2/2014 | Strobel et al. |
| 8,868,572 | B2 | 10/2014 | Sethi et al. |
| 8,954,424 | B2 | 2/2015 | Gupta et al. |
| 9,104,718 | B1 | 8/2015 | Levy et al. |
| 9,324,104 | B1 | 4/2016 | Levy et al. |
| 9,465,873 | B1 | 10/2016 | Franke et al. |
| 9,690,857 | B1 | 6/2017 | Franke et al. |
| 9,710,843 | B2 | 7/2017 | Levy et al. |
| 9,799,000 | B2 | 10/2017 | Sethi et al. |
| 9,830,635 | B1 | 11/2017 | Levy et al. |
| 10,007,946 | B1 | 6/2018 | Levy et al. |
| 10,109,001 | B1 | 10/2018 | Levy et al. |
| 10,115,074 | B1 | 10/2018 | Sethi et al. |
| 10,127,596 | B1 | 11/2018 | Franke et al. |
| 10,157,231 | B1 | 12/2018 | Franke et al. |
| 10,268,704 | B1 | 4/2019 | Sanderson et al. |
| 2002/0035520 | A1 | 3/2002 | Weiss |
| 2002/0077931 | A1 | 6/2002 | Henrion et al. |
| 2003/0004745 | A1 | 1/2003 | Takakura |
| 2003/0088457 | A1 | 5/2003 | Keil et al. |
| 2003/0089218 | A1 | 5/2003 | Gang et al. |
| 2003/0229552 | A1 | 12/2003 | Lebaric et al. |
| 2005/0027670 | A1 | 2/2005 | Petropoulos |
| 2005/0086070 | A1 | 4/2005 | Engelman |
| 2005/0154717 | A1 | 7/2005 | Watson et al. |
| 2006/0026081 | A1 | 2/2006 | Keil et al. |
| 2006/0041465 | A1 | 2/2006 | Woehler |
| 2006/0248035 | A1 | 11/2006 | Gendler |
| 2007/0027741 | A1 | 2/2007 | Gruhl et al. |
| 2007/0060114 | A1 | 3/2007 | Ramer et al. |
| 2007/0060129 | A1 | 3/2007 | Ramer et al. |
| 2007/0143184 | A1 | 6/2007 | Szmanda |
| 2007/0156514 | A1 | 7/2007 | Wright et al. |
| 2008/0065425 | A1 | 3/2008 | Giuffre et al. |
| 2008/0222010 | A1 | 9/2008 | Hudak et al. |
| 2009/0006118 | A1 | 1/2009 | Pollak |
| 2009/0112927 | A1 | 4/2009 | Chitnis et al. |
| 2011/0055207 | A1 | 3/2011 | Schorzman et al. |
| 2012/0005045 | A1 | 1/2012 | Baker |
| 2012/0047158 | A1 | 2/2012 | Lee et al. |
| 2013/0030870 | A1 | 1/2013 | Swinson et al. |
| 2013/0159057 | A1 | 6/2013 | Hsiao |
| 2013/0179252 | A1 | 7/2013 | Dong et al. |
| 2013/0246300 | A1 | 9/2013 | Fischer |
| 2014/0032572 | A1 | 1/2014 | Eustice et al. |
| 2014/0100989 | A1 | 4/2014 | Zhang |
| 2014/0257934 | A1 | 9/2014 | Chrzan et al. |
| 2014/0258042 | A1 | 9/2014 | Butler et al. |
| 2014/0258044 | A1 | 9/2014 | Chrzan et al. |
| 2014/0279195 | A1 | 9/2014 | Kubicki et al. |
| 2015/0100420 | A1 | 4/2015 | Van Horn et al. |
| 2015/0324737 | A1 | 11/2015 | Chrzan et al. |
| 2015/0324879 | A1 | 11/2015 | Lu et al. |
| 2017/0372402 | A1 | 12/2017 | Levy et al. |

PARTITIONED DISTRIBUTED DATABASE SYSTEMS, DEVICES, AND METHODS

CROSS-REFERENCE TO RELATED APPLICATIONS

This application is a continuation of U.S. patent application Ser. No. 16/158,189 (filed on Oct. 11, 2018) and titled "PARTITIONED DISTRIBUTED DATABASE SYSTEMS, DEVICES, AND METHODS," which claims the priority benefit of U.S. Provisional Patent Application No. 62/571, 691 (filed on Oct. 12, 2017) and titled "PARTITIONED DISTRIBUTED DATABASE SYSTEMS, DEVICES, AND METHODS." Any and all applications for which a foreign or domestic priority claim is identified in the Application Data Sheet as filed with the present application are hereby incorporated by reference under 37 CFR 1.57.

BACKGROUND

Technical Fields

This disclosure relates to computer databases, communications architecture, server-client interactions, and data compression, such as for website display and internet communications.

Description of the Related Technology

Despite advances in computer technology, computers still take time to process vast quantities of data. Websites can take time to load. Connection latency and data transfer time can significantly contribute to the loading time of a website.

SUMMARY

The disclosure herein relates to improved database communications to improve the communication and processing speeds between clients and servers. Response speeds for clients can be greatly improved.

Some aspects feature a computer-implemented query system for electronic query transmission and partial dataset receiving over a computer network connection. The computer-implemented query system includes: a user input device, an output device, and one or more processors. The one or more processors are configured to: receive, through the user input device, a first user command; construct a first query based at least in part on the first user command; send the first query through a network to query a server database on a remote server, wherein the first query operates a server partition of the server database that includes a cluster of related records of the server database; receive, from the remote server, a first response to the first query; transmit data to the output device to present a result generated based at least in part on the first response; receive a plurality of blocks sufficient to form a local partition that comprises at least a portion of the server partition of the server database; receive, through the user input device, a second user command; construct a second query based at least in part on the second user command. The one or more processors are also configured to, after receiving the plurality of blocks: use the plurality of blocks to construct and locally store a local database comprising the local partition; determine that the second query references the local database stored in the client system; execute the second query; and transmit data to the output device to present a second result generated based at least in part on a result of the second query.

The computer-implemented query system also include one, any combination of, or all of the following features. The local partition includes a local plurality of records that corresponds to at least a subset of the cluster of related records of the server database. The local partition includes a local plurality of records that correspond to at least a subset of the cluster of related records of the server database, with each of the local plurality of records include at least a subset of fields of the cluster of related records of the server database. The local partition includes a local plurality of records that includes each record of the cluster of related record of the server database, but the local plurality of records includes a subset of fields in the cluster of related record of the server database. The one or more processors are further configured to, before receiving the plurality of blocks: send a plurality of queries to the remote server; and receive, from the remote server, a plurality of responses to the plurality of queries. The query system can further include a memory configured to store the plurality of blocks received from the remote server. The local database includes field data that is compressed, compacted, or encoded. The blocks include data that is compressed, compacted, or encoded. The database includes data encoded using at least one of: dictionary variants of primitives; or normalized row references. The database includes a Huffman tree encoded field. The first query operates on the data, and the second query operates on a narrower subset of the data. The one or more processors are further configured to: construct a third query based at least in part on the second user command; send the third query through the network to query the database; receive, from the remote server in response to sending the third query, picture data for displaying a graphical image; and transmit the picture data to the output device to supplement the second result. The second query is executed without backbone latency, network latency, or connection latency to the remote server. When presenting the second result requires missing data that is not available in the local partition, the one or more processors are further configured to: send a request through the network to the remote server to retrieve the missing data; prior to receiving a response to the request for the missing data, transmit data to the output device to present a partial result based on data available in the local partition; and after receiving the missing data from the remote server, transmit data to the output device to supplement the partial result. The partial result includes one or more placeholder features for the missing data. The missing data includes image data. The missing data includes data that is larger in size than the data stored in any field of the local partition. The missing data comprises data that is at least 10 times larger than the data stored in any field of the local partition. The user input device is configured to present a graphical user interface feature that enables a user to dynamically adjust a parameter of the second query, and the one or more processors are further configured to, in response to an adjustment to the parameter of the second query caused by the graphical user interface feature: determine that additional missing data is required to fully update the results presented by the output device; send a request through the network to the remote server to retrieve the additional missing data; prior to receiving a response to the request for the additional missing data, transmit data to the output device to present a partial updated result based on data available in the local partition; and after receiving the additional missing data from the remote server, transmit data to the output device to supplement the updated result. The graphical user interface feature comprises an activated state and a deactivated state, with the activated state allowing dynamic adjustment of the graphical user interface feature to cause dynamic adjustment of the parameter of the second query; and wherein the one or more processors are further configured to: when the graphical user interface feature is in the activated state, refrain from requesting the additional missing data until the graphical user interface feature transitions to the deactivated state. The activated state corresponds to the graphical user interface feature being selected, and the deactivated state corresponds to the graphical user interface feature not being selected. The graphical user interface feature includes a slider. The one or more processors are further configured to: wait a predetermined amount of time after the adjustment to the parameter of the second query before sending the request to retrieve the additional missing data; and if the parameter of the second query is further adjusted by the graphical user interface feature prior to the predetermined amount of time elapsing, wait until the parameter of the second query has not been adjusted for the predetermined amount of time before sending the request to retrieve the additional missing data. the output device comprises a graphical user interface used for presenting the partial result, and wherein supplementing the partial result with the missing data is performed without a full refresh of the graphical user interface.

Some aspects feature a computer-implemented method for partial database receiving over a network connection for progressively faster query execution. The method includes: receiving one or more first user commands; constructing one or more first queries based at least in part on the first user commands; determining that at least one of the first queries references a server partition of the database located on a remote server that does not yet have available a corresponding local partition in a client computer system; sending the first queries to the remote server; receiving, from the remote server, one or more first responses to the first queries; receiving blocks to form the local partition of the database; receiving one or more second user commands; constructing one or more second queries based at least in part on the second user commands. The method also includes, after receiving sufficient blocks to form the local partition of the database: determining that the second queries reference the local partition of the database; and executing the second queries.

The method can include one, any combination of, or all of the following features. The local partition of the database is formed from the blocks, and the local partition corresponds to and is a subset of the server partition. The local partition comprises a plurality of records of the server partition, with each of the plurality of records comprising a subset of fields of the server partition. The local partition comprises each record of the server partition, but the records stored in the local partition comprise a subset of fields of the records stored in the server partition. The database is a columnar database, and a partition scheme is based on a column of the database. The database includes over ten million bitsets, and the second query is executed in under 300 ms. The method further includes executing the second queries in 20 ms or faster, wherein the database includes at least 1 million records. The local partition includes records that correspond to at least a subset of server records included in the server partition of the database. The local partition includes records that correspond to each of the server records included in the server partition of the database. Fields of the records included in the local partition correspond to at least a subset of fields of the server records included in the server partition of the database.

Some aspects feature a server including: one or more storage devices comprising a partitioned, columnar database; and one or more processors. The one or more processors are configured to: receive, from a client system, a first query on the columnar database; determine a server partition of the columnar database referenced by the first query; execute the first query on the server partition of partitioned, columnar database; send a first response to the first query to the client system; send one or more first blocks comprising data from the server partition to the client system; receive a second query on the server partition of the partitioned, columnar database; execute the second query on the server partition of the partitioned, columnar database; send a second response to the second query to the client system; and send a sufficient number of blocks comprising data from the server partition to the client system for the client system to construct a local partition corresponding to the server partition of the partitioned, columnar database, the sufficient number of blocks including the one or more first blocks.

The server can feature one, any combination of, or all of the following: sending the sufficient number of blocks is configured to enable the client system to construct the local partition to comprise a plurality of records of the server partition, with each of the plurality of records comprising a subset of fields of the server partition. Sending the sufficient number of blocks is configured to enable the client system to construct the local partition to comprise each record of the server partition, but with the records stored in the local partition comprising a subset of fields of the records stored in the server partition. The fields of the database are stored contiguously, in row order, within partitions of the partitioned, columnar database. The server is a content delivery network server. The server is configured to prioritize bandwidth for receive queries and transmit responses to queries over sending blocks. The server is configured to execute the first query using a templated query evaluator.

For purposes of summarizing the disclosure, certain aspects, advantages, and novel features have been described. It is to be understood that not necessarily all such advantages can be achieved in accordance with any particular embodiment. Thus, various embodiments can achieve or optimize one advantage or group of advantages as taught herein without necessarily achieving other advantages as can be taught or suggested herein.

DETAILED DESCRIPTION

Figure 1A:
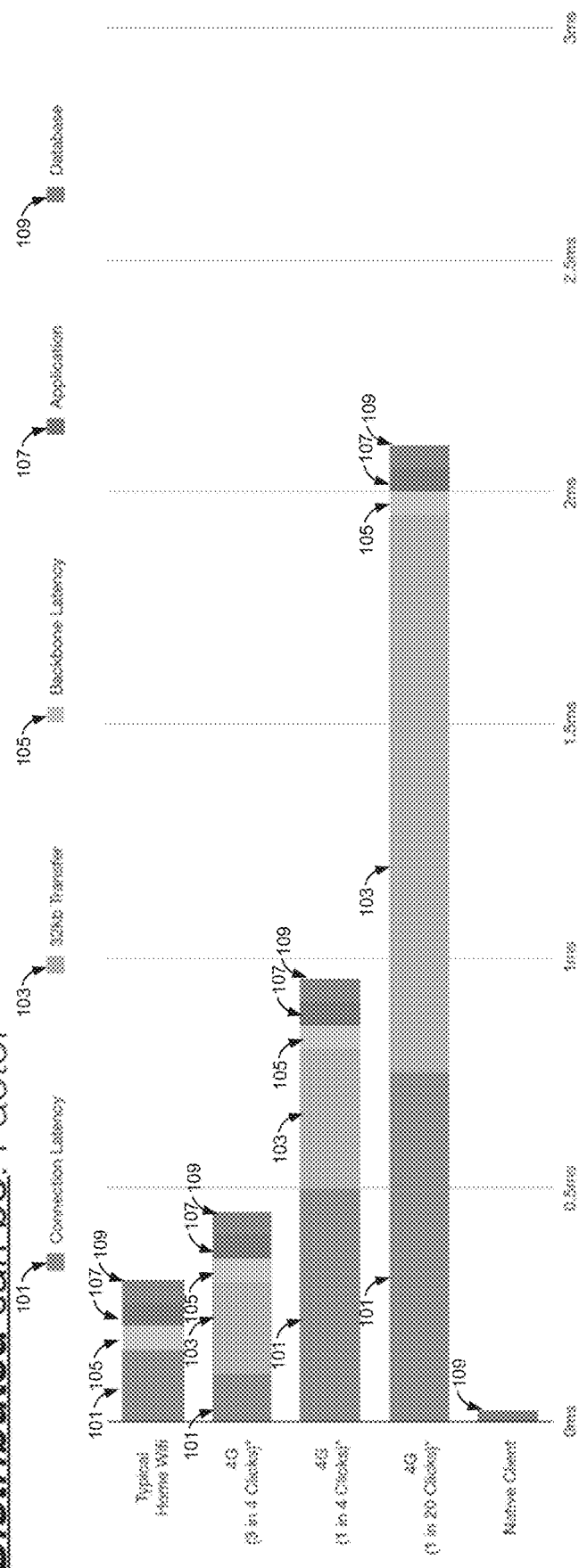
FIG. 1A shows a graph of example times for fetching a 32 kb JSON document.

The following detailed description of embodiments presents various descriptions of specific embodiments. However, the innovations described herein can be embodied in a multitude of different ways as defined and covered by the claims. In this description, reference is made to the drawings in which like reference numerals may indicate identical or functionally similar elements. It will be understood that elements illustrated in the figures are not necessarily drawn to scale. Moreover, it will be understood that systems, apparatus, and electronic devices including one or more of the innovations discussed herein can include more elements than illustrated in a drawing and/or a subset of the elements illustrated in a drawing. Further, some embodiments can incorporate any suitable combination of features from two or more drawings. The headings provided herein are for convenience and do not necessarily affect the scope or meaning of the claims.

Introduction

The speed of a website can substantially impact the user experience. Slower websites tend to see reductions in traffic, revenue, and conversions. Improving the response and loading speeds of a website can improve the user experience.

A client may sometimes want to query a large database on a remote server for information. As a first option, the client can download the large database and then locally execute the query. However, due to data transmission speeds, it may take a long time to download the large database. As a second option, it can be much faster for the client to transmit the query to the remote server, and the remote server can execute the query and transmit a result of the query to the client. Although the second option can be faster than the time for transmitting the large database, the second option still takes time and incurs network latency. In the context of making multiple queries to the large database, additional options are discussed herein that allow for even faster queries that avoid the network latency.

FIG. 1A shows a graph of example times for fetching a 32 kb JSON document. The graph includes times for a typical home wifi, for times on a 4G network, and for a natively running client. The 4G network times are approximate fastest achieved times measured for about 3 of 4 clicks (about 75% of the time), about 1 of 4 clicks (about 25% of the time), and about 1 in 20 clicks (about 5% of the time). The example times are further shown as times for connection latency 101, 32 kb transfer times 103, backbone latency 105, application latency 107, and database latency 109.

As the graph shows, the connection latency 101 and 32 kb transfer latency 103 can consume about half of the total fetch time or more. Furthermore, the backbone latency 107 and application latency 107 take about as much time as the database latency 109. A client can locally fetch the 32 kb JSON document in less than 0.1 ms.

Figure 1B:
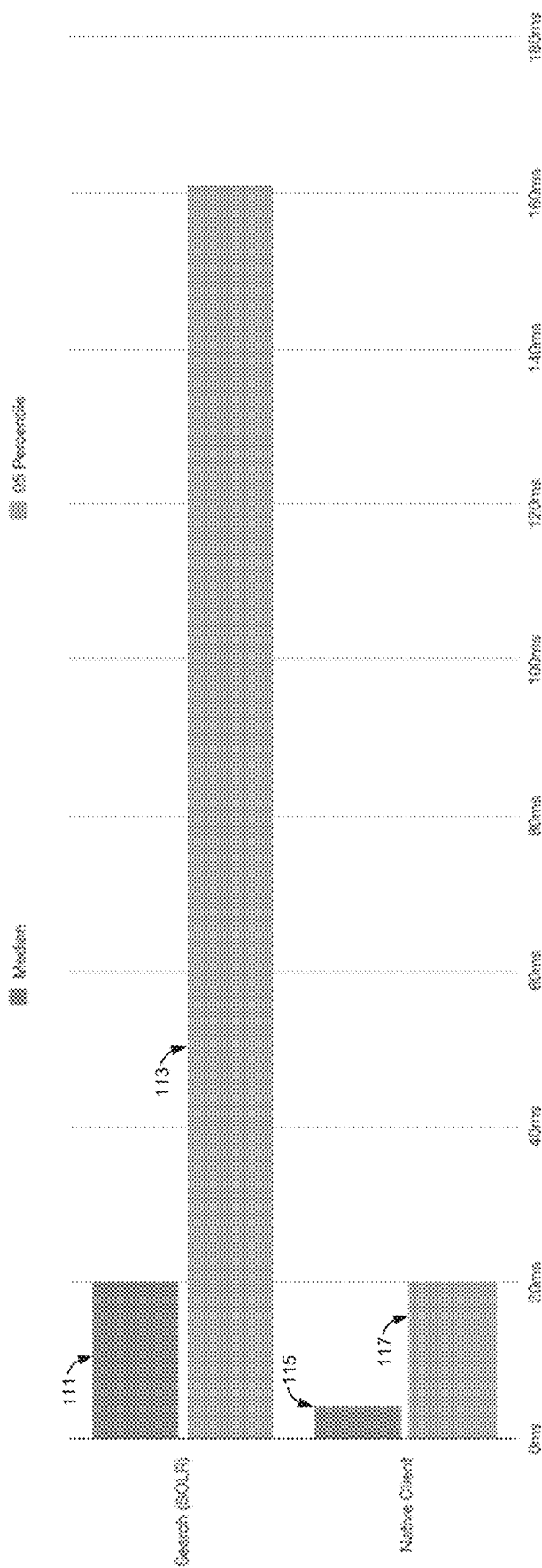
FIG. 1B shows a graph of example uncached server-side query response times.

FIG. 1B shows a graph of uncached response times for typical queries against a large database. The large database can be, for example, gigabytes or larger and include at least tens of megabytes or hundreds of megabytes of data that is available to a client. A Solr search or Elasicsearch executed on a remote database has a median response time 111 of about 20 ms and a $95^{th}$ percentile response time 113 of about 161 ms. The same queries have a median response time 115 of about 3 ms and a $95^{th}$ percentile response time 117 of about 20 ms when natively executed on a client. Because fewer variables contribute to latency, local execution can consistently and more predictably provide faster query responses.

In some applications, a website can be displayed on a user's computer. The computer receives user inputs and generates queries to request certain data to be displayed on the website. In response to the client request for data from a remote server, a number of activities can take place, each of which takes time, including connection latency, data transfer latency, backbone latency, application latency, and database latency. In some applications, the loading time of a website can substantially impact the effectiveness of a website. Longer load and response times, even if only for a fraction of a second, significantly impact the user experience and can cause substantial reductions in website traffic and conversions or revenue.

Some websites are frequently used to run queries against a database. Examples include websites for searching for cars, houses, and other shopping goods. Other websites include data analysis websites. Users can access the websites to perform an initial query (e.g., an initial search), and then perform additional queries (e.g., subsequent searches to narrow down the list of results). Each time a search or narrowing is performed, the website displayed on a user's computer can take time to respond due to the connection latency, data transfer latency, backbone latency, application latency, and database latency.

Embodiments disclosed herein can improve the speed of responding to queries, especially in the context of consumer searches. In some embodiments, data related to cars, houses, or other unique items can be quickly queried and retrieved. For example, people interested in buying cars or houses may search within a geographic area, by price, by features, by color, by size, by condition, etc. These filters can be performed as a sequence of queries. In response to receiving an initial user query, a remote server can perform the query to return a query response to the user device. Based on the initial query, the server can also transmit a partition (or portion thereof) from the database to a user device. One the partition (or portion thereof) is transmitted to the user device, then for any subsequent user queries on the partition, the user device can subsequently execute queries without communicating with the remote database.

Same or similar software can run in both datacenter and client devices so that they can process queries similarly. Some queries can be executed against a database in a remote server until a partition of the database is locally instantiated on a client. The partition of the database can be read-only data that is consistent with the remote database. Subsequent queries against the partition can be performed locally by the client.

The client can receive an arbitrary and/or complex search query from a user and decide whether to perform the query locally or on the remote server. Considerations can include whether the referenced partitions of data are available on the client, whether the referenced data is too large, and/or whether the query will be too computationally expensive to run. If one or more conditions are met, then the query can be executed on the remote server, even if a queried partition of the database is available on the client.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Partition: A partition is a cluster or subset of related records of a database (e.g., a database having records corresponding to a plurality of inventory items, such as used cars or other items). Partitions can desirably be fully or partially transmitted from a server to a client for local use by the client. Partitions can be created according to a partition scheme that defines which records are "related" for any particular partition (e.g., based on location, make/model, price driver, demand driver, price bracket, any combination of fields, and/or the like). In some embodiments, partitions can be dynamically created according to dynamically selected partition schemes. Each partition can include groups of records (e.g., a record for each car) that are related according to the partition scheme. Each record (e.g., of a car) can include a plurality of fields for storage of information associated with that record (e.g., properties such as make, model, price, color, seller, and/or the like, links to images associated with the item, and/or any other information that may be relevant to that record). Some fields may be intended to remain only at the server-side, and to not be transmitted to a client when that record's partition is transmitted to a client. In some embodiments, individual records of a database can be assigned to multiple partitions. For example, a partitioning scheme based on location may place a record in one partition, whereas a partitioning scheme based on price bracket may place the record in a different partition.

In some embodiments, partitions comprise actual copies of data from the database (in other words, to create the partition, data is copied from the relevant database records to a new database and/or database table). In some embodiments, partitions comprise pointers or links to data records in a main database, instead of copying the records to a new database and/or a new database table. In some embodiments, the inclusion of a particular record in a partition is indicated by data in a field of that record. In some embodiments, a combination of the above methods is used to create partitions and/or to define which records are associated with which partitions.

The detailed description discusses databases on servers that can be partitioned, and a partition can be sent to a client. The partition that is sent to and received by a client can correspond to the partition of the database on the server, and the partition sent to and received by the client can be, but may not necessarily be, an exact copy of the partition of the database on the server. In some cases, a partition of the database on the server may include internal data including records (e.g., test or dummy records) and/or fields (e.g., internal identification numbers, data intended to only be used on the server side, and/or the like) that are not included in the copy of the partition that is sent to and received by the client. For example, a partition can be split orthogonally by field, with only some of the fields of each record being transmitted to a client when the partition is transmitted to the client. Accordingly, the partition that is sent to and received by a client may actually be (but is not necessarily) a subset of the corresponding partition on a server, even if not explicitly stated. This can be desirable, for example, to reduce the amount of data storage required by the local client version of the partition, to reduce the amount of data required to be transmitted over a network connection, to avoid transmitting data that would not be useful to the client in a particular use case, to avoid transmitting trade secret data to the client, and/or the like. Additional examples of partitions are discussed below.

Example Network Architecture

Figure 2:
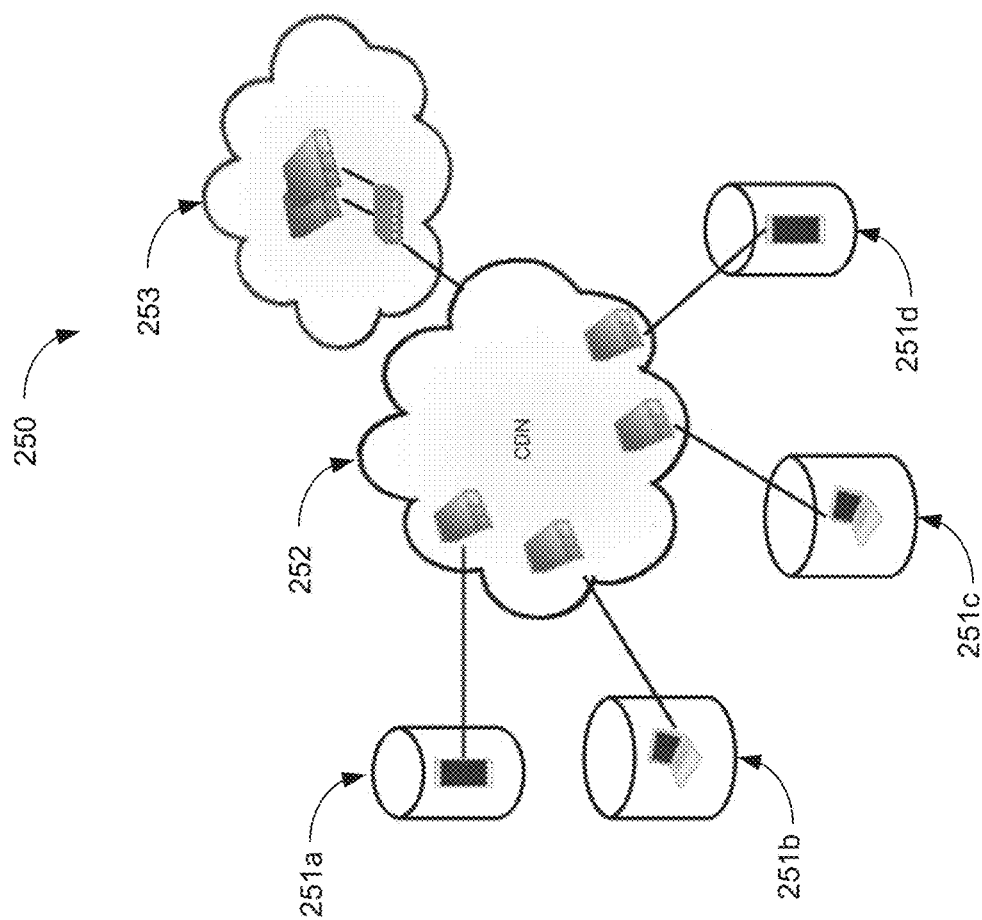
FIG. 2 shows example diagrams of distributed database systems.
Figure 2:
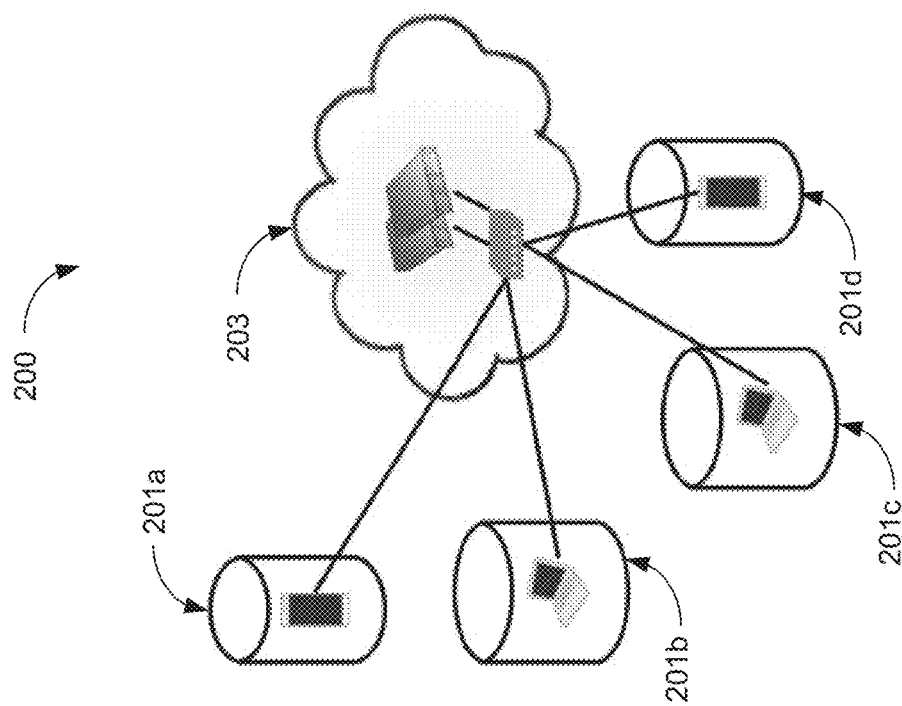

FIG. 2 shows an example diagram of network architectures for deploying distributed database systems. A first network 200 includes a plurality of user devices 201a-201d and a remote server 203 that is accessible to the plurality of user devices 201a-201d through a network. The remote server 203 can include a database of records to be queried by the user devices 201a-201d. A second network 250 includes a plurality of user devices 251a-251d with an intermediary content delivery network (CDN) 252 between the plurality of user devices 251a-251d and a remote server 253. The user devices 201a-201d and 251a-251d may also be referred to as clients.

The various user devices 201 and 251 may query or otherwise access information from databases in the servers 203 and 253, respectively. In the second network 250, the CDN 252 can store or cache database information and provide the cached information in response to queries or other requests from the user devices 251a-251d. The CDN 252 can cache recently or commonly accessed information and otherwise be configured to act like the remote server 253 and have a copy or partial copy of the remote database.

In various embodiments, the database in servers 203 and 253, can be a partitioned columnar distributed database described herein. The servers 203 and 253 can provide information to user devices in response to queries, and the servers can also be configured to provide blocks of data to the user devices so that the user device can locally execute subsequent queries. By having user devices locally execute queries, processing is offloaded from the servers to the user devices, and server scaling costs can be reduced. In some embodiments, the CDN can behave the same as or similarly to the servers in storing data and responding to user requests whenever the CDN has information responsive to a user request. Otherwise, if the CDN does not have information responsive to a user request, the CDN can behave like an end user in forwarding data requests to the servers and locally caching blocks of data.

Partitioned Columnar Distributed Database

Databases can be partitioned and stored in servers, including content delivery networks, datacenters, or other network points. Partitioned, columnar databases can be distributed to clients such that subsequent queries can be performed on the partitioned, columnar database without connection latency, data transfer latency, backbone latency, and/or application latency. Offloading some query processing to clients can reduce datacenter scaling costs. In some embodiments, the database can be a non-relational database such as a NoSQL database or other type of database.

The database can be partitioned (e.g., split) into different groups or clusters of related records or items according to different schemes. The data can also be redundantly stored under a plurality of different schemes. As described above, a particular database can be partitioned in a number of ways, with some of the records of the database potentially existing in multiple partitions. The partitions may exist virtually on the server side (for example, by using a table that comprises links or pointers to records in the main database) and/or the partitions may exist on the server side in separate databases and/or database tables that comprise data copied from the main database. The partitioned data can be further split orthogonally by field. Partitioned data can be stored in physically contiguous parts of a disk or in various ways in arrangements of physical disks that facilitate access to partitions of data. Partitions can have metadata for fast searches on the partitioned fields and can include a dataset sufficient to answer a query based on that field. For example, a geographic partitioner (e.g., a partitioning scheme that defines "related" records based on geographic location) can associate a bounding shape with each partition so that a search can exclude partitions that do not intersect with the search area, and if the shape is totally included within a search area, then the geographic partitioner can short-circuit a distance clause of a search area. The bounding shape can indicate various elliptical shapes, circular shapes of different radius (e.g., 10 mile radius, 30 mile radius, 50 mile radius, 100 mile radius), triangles, quadrilaterals, and other polygons. A lookup structure of the metadata can be maintained for each partitioner and dataset.

In some embodiments, data about used cars can be partitioned geographically, by make or model, by vehicle type, by color, by price bracket, or any other driver of consumer demand or factor driving price. Within each partition, any different property can be used to further split the partition by field.

In some embodiments, data about houses can be partitioned by size brackets, location, style, color, price bracket, age, neighborhood, features, style, or any other driver of consumer demand or factor driving price. Within each partition, any different property can be used to further split the partition by field.

In some schemes, a partition scheme can be determined based on broad search criteria that users frequently input, such as a search location, price range, model, or style. Those partitions can be further split by fields that users frequently add as subsequent filters to narrow down a search, such as features.

In response to a client query, a relevant partition (or portion thereof) can be delivered to the client. At any time, the partitions can be consistent subsets of the database small enough to deliver to a client for the client to query. In some embodiments, the database can be many orders of magnitude larger than the subsets, such as at least 1, 2, 3, 4, 5, or 10 orders of magnitude larger. For example, a partition as received by the client may be about 100 kilobytes or about tens of megabytes or more. The same partition, stored on the server side with fields that do not get transmitted to the client, may be significantly larger than the version of the partition received by the client, such as 2×, 10×, 50×, or 100× larger, or more. A database (e.g., a server-side database comprising multiple partitions) may be 1 gigabyte, 10 gigabytes, 100 gigabytes, or more. In some embodiments, the database may include some data that is not directly accessible to clients, but the partition of the database that is accessible to the client can still be hundreds of megabytes, many gigabytes, or larger (although it can be desirable to reduce the client-side partition size, to, for example, reduce storage space required at the client, to reduce network bandwidth required, and/or the like).

Delivering the partitions can provide locality of access to a relevant subsection of the database while excluding a majority of the database. Once provided to a client, the client can query the locally cached partition of the database as if the partition were the entire database. For applications where queries include narrowing searches, such as searches for houses and cars, querying the local partition can yield the same result as querying the database. When a query seeks information not included in a local partition, additional partitions can be retrieved from a remote database, and/or additional portions of the present partition may be retrieved. This way, a local database can be expanded in response to subsequent queries on larger scopes of the remote database. Within partitions, fields can be stored contiguously, such as in row order. Accordingly, clients can download subsets of a database that may include records of interest. In some cases, a remote server may provide a superset of records that include the records of interest. In some cases, the remote server may dynamically determine a partition that includes the record of interest.

As an example, a database can include a plurality of records of cars (or other inventory item). Each record includes a plurality of fields (e.g., make, model, location, price, seller, color, links to images, and/or the like). A partition of the database can include a cluster of related records according to a partition scheme for transmitting to a client. The partition scheme can be based on any number of dimensions, such as geographic location, make, model, price, price bracket, demand driver, and/or the like. The records may include more fields than will be transmitted to the client. In other words, the partition transmitted to a client may include a subset of the fields but not necessarily include every field of the records.

When the partition is transmitted to the client, the partition can be transmitted as a plurality of blocks. Each block can be a subset of the partition. A client, after receiving the plurality of blocks (or at least some of the plurality of blocks), can reconstruct the corresponding partition (or at least a portion of the corresponding partition) using the blocks. The reconstructed partition may include, for each record in the partition, any subset of fields intended to be transmitted to the client.

Figure 3:
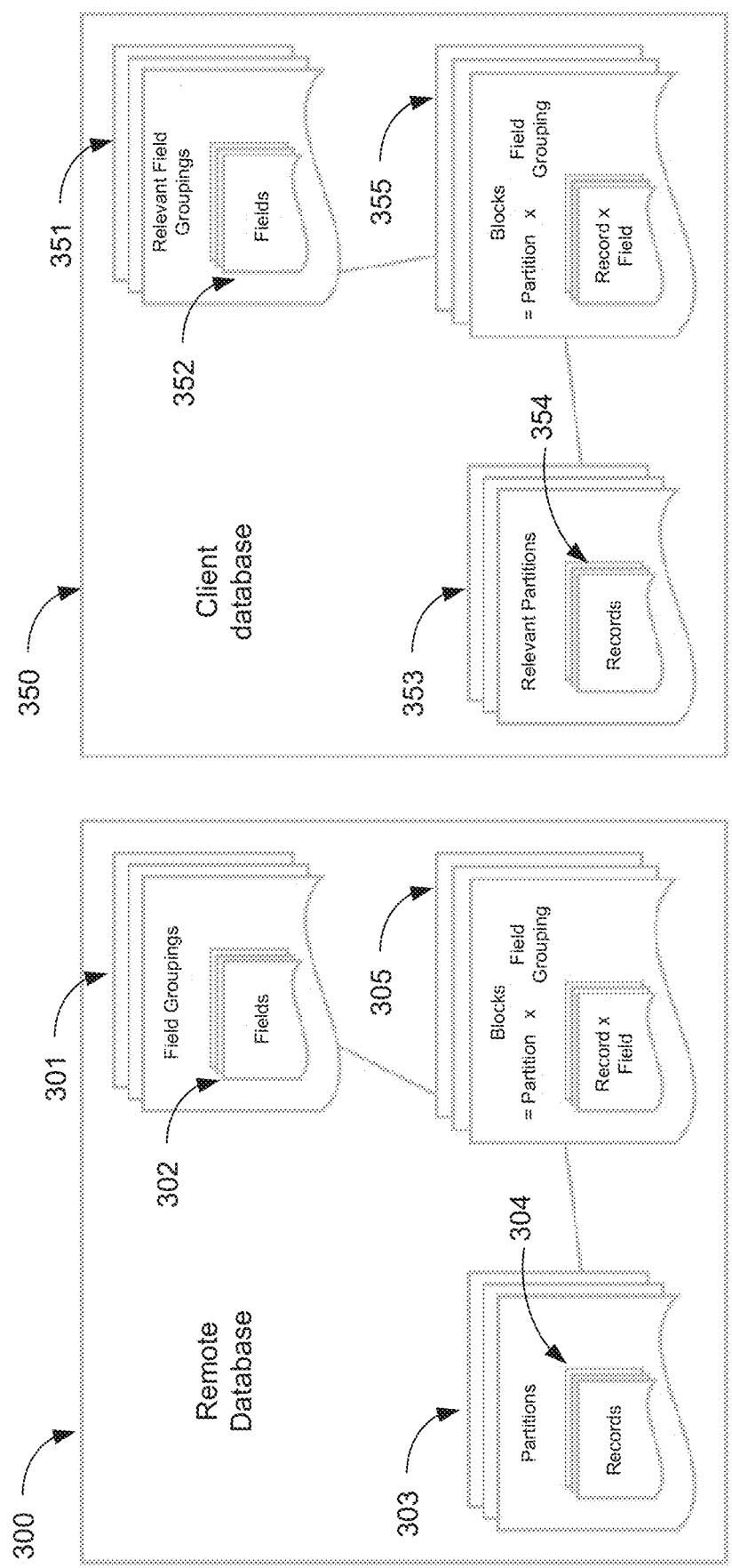
FIG. 3 shows example diagrams of partitioned databases.

FIG. 3 shows example diagrams of partitioned databases. The figure shows a remote database 300 and a client database 350.

A remote database 300 includes a plurality of partitions 303 according to a partition scheme. Each partition 303 includes a plurality of records 304. In some embodiments, different partitions may include overlapping records. The remote database 300 can be a columnar database, and the partitions 303 can be divided based on the columns. A plurality of field groupings 301, each including one or more fields 302, can be used to generate a plurality of blocks 305. Each block 305 can include particular fields from a plurality of records of a partition. Blocks 305 can be used to reconstruct a partition of a database, such as a partition that meets certain filter criteria.

For example, a remote database 300 can be a database that includes records 304 of used cars (or other inventory items), where each record corresponds to an entry for a used car (or another type of inventory item). The records 304 can be divided into partitions 303 based on a partition scheme such that each partition 303 includes a cluster of related records 304. In some cases, a record 304 can be included in more than one partition 303. The database can be partitioned according to a partition scheme based on values for one or a combination of fields such as location, year, price, make, and model, etc. Each partition can include or reference records of the vehicles satisfying the partition criteria.

The fields 302 can be grouped into a plurality of field groupings 301. For example, a first field grouping can include commonly searched fields for a plurality of vehicles, such as make, model, location, year, price, color, body style, and the like. A second field grouping can include less commonly searched fields for the plurality of vehicles, such as specific interior features, trunk size, trim, etc. There can be additional field groupings.

One or more blocks 305 can include the field groupings 301 for each record 304 of a used vehicle in a partition 303. For example, a user may search for used cars in a given location. Accordingly, one or more partitions that include at least records of used cars in the given location can be accessed. From within these one or more partitions, the records 304 can be accessed, and a block can be generated to include the first field grouping for each of the records 304. Accordingly, the block can include, for each record 304 of the one or more partitions, each field of the first field grouping, such as the make, model, location, year, price, color, body style, and the like.

The client database 350 can be a corresponding copy of a partition of the remote database that is relevant to queries executed by a user. The client database can include a plurality of relevant partitions 353. The relevant partitions 353 can be a subset of the partitions 303 that are relevant to a user query. Each relevant partition 353 can include a plurality of records 354 that can include the data from the blocks 355 received from a remote database. Accordingly, the records 354 of the relevant partitions 353 may include the fields received in the blocks 355 (such as fields from the first field grouping) and might not include other fields (such as fields from the second field grouping) until a block including the other fields is received by the client.

A plurality of relevant field groupings 351, each including one or more fields 352, can be used to determine relevant blocks 355 to be requested from the remote database 300. The relevant field groupings 351 can be determined based on a user submitted query. Each block 355 can include a plurality of records that have particular field properties. Each block 355 can be received from the remote database 300 and collected to form the relevant partitions 353.

For example, a user may search for used cars in a given location priced within a certain price range. A client may receive a plurality of blocks including records of cars with the prices within the price range. The client can assemble the blocks into the relevant partitions of a database for querying.

Compression and Encoding

Transmitting partitions of a database to a client takes time. A client may download the partitions from a CDN or a remote server. The size of the partition can affect the speed of transferring the dataset, as well as the speed of responding to a query. Long download times may offset potential efficiency gains. Larger sizes of partitions take longer to download. It can be counter-intuitive to transfer a dataset (or partition thereof) in response to a query because, in addition to the processing time for a query, the data transfer time of the dataset contributes to additional latency. Indeed, remote servers are often designed to store large databases and execute queries because transmission of the database to clients to locally execute queries would take too long. However, the data transfer time, as well as subsequent query times, can be reduced with various compression techniques. Accordingly, blocks of data that would otherwise take too long to transmit and slow response speeds can be reduced in size to speed up transmission such that by transmitting the blocks, the response speed of the user interface can be improved.

For example, data for querying 24 different fields for about 100,000 cars within an area can be stored in about 1.5 megabytes, and data for querying about 1,000,000 cars can be stored in about 10 megabytes. Without compression, the size of the data would be larger and would take longer to transmit. The data can be downloaded to a user device after an initial query while the user is engaged in other activities and not waiting for a query response. For example, the download can occur while a user is browsing through initial search results or preparing additional filters for a second query.

Compression can also improve processing speed. For example, a typical x86 based processor may take about 0.5 milliseconds to scan an entire database of about 10 million records that are about 4 bytes each, where data is stored as uncompressed integer fields. If the data is compressed to half the size or smaller, then the data can be read about twice as quickly. Furthermore, if the data is partitioned, then the relevant partition of the data can be consulted to prepare a response to some queries, speeding up the data reading even more.

Data in a partition can be encoded in columns. For example, custom column encodings can include "raw" and dictionary variants of Int, Long, String, and Float; normalized row references (e.g., make/model/trim for cars, city/state/country); encoded string tokens (e.g., JSON, description), properties, Booleans, and locations. To reduce column size, each column can be encoded as a Huffman tree that can be decoded with dictionaries. Tokens can have context-aware codes. Raw integer coders can use Huffman trees of smaller or optimal integer bounds to efficiently encode higher density clusters. Bitsets representing Boolean properties can use a Huffman/run-length encoding hybrid. Compression algorithms (e.g., GZip) can be used to compress repetitious sequences of code. In some embodiments, other types of encoders (e.g., besides arithmetic encoders) can be used. Other types of column encodings can also be used.

In memory, data can be compressed (e.g., Boolean properties via bit sets, String token fields can retain on-wire formats and be Huffman-decoded on access, and other data types can be compressed using other tools). These structures can be optimized for random access and single instruction, multiple data (SIMD) accelerated computations and logical operations. Compressible fields can be built over primitives in tandem with specialized dictionary objects.

For easier implementation, clients can execute queries and programs similarly or identically on a remote partitioned columnar distributed NoSQL database as on a local copy of a partition of the remote database. Examples of queries can include searching operations, filtering operations, sorting operations, statistical operations, etc.

After parts of the partitioned, columnar databases are distributed to clients, the distributed partitions can be updated. For example, a client can check if a threshold amount of time has passed since the client received the partitioned, columnar database, or check with the remote server to see if the partitioned, columnar databases has changed since last receiving the partitioned, columnar database. If so, then the client can request an updated copy of the partition.

In some embodiments, the databases are not columnar. For example, the databases can be row-oriented databases. Being columnar can make a database more specific to larger corpora and there can be efficiency benefits to using columnar databases, such as reduced cost and time to transfer, more efficient coding, and more efficient querying.

Example Client Integration

Figure 4:
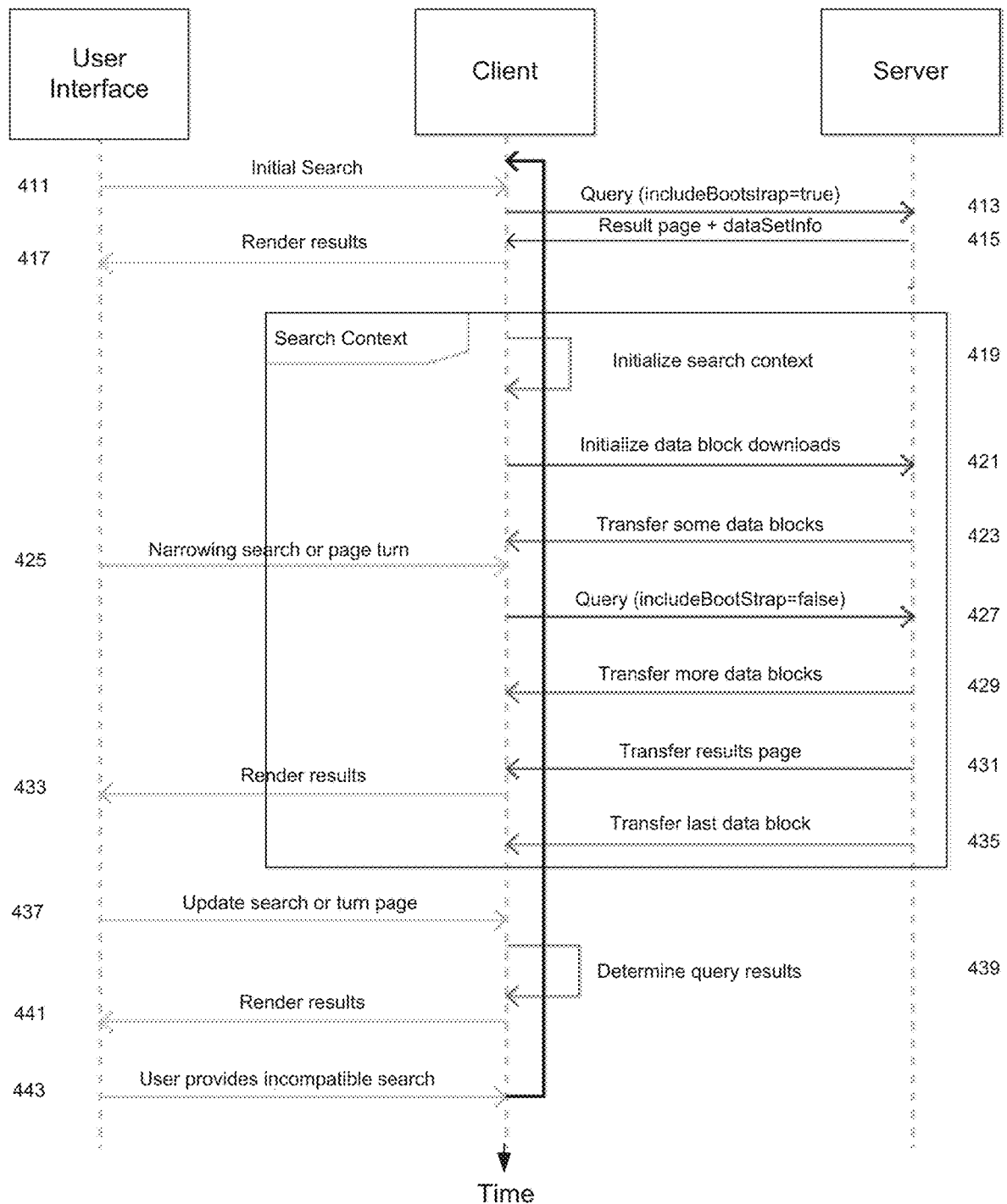
FIG. 4 shows an example timing diagram of interactions between a user interface, client, and server.

FIG. 4 shows an example timing diagram of interactions between a user interface 401, client 403, and remote server 405. The y-axis indicates the progression of time from top to bottom. The user interface 401 presents information to a user and can accept user commands. The user interface can include input/output devices, such as a display monitor, keyboard, mouse, touchscreen, speakers, etc. The client 403 can be a user computing device. The remote server 405 can be a CDN or other remotely accessible sever that includes a database. A plurality of interactions between the user interface 401, client 403, and remote sever 405 are depicted as arrows. In various embodiments, the remote server 405 can be a CDN, an edge cache, or other remote computer. In some embodiments, the interactions with the remote server 405 can be performed by different servers.

A client can send queries to a database on a remote server. One or more initial queries can be executed by the remote server until a local, partial instance of the database can be downloaded to the client as one or more data blocks. The client can receive the data set information and bootstrap or locally seed the meta-database. The meta-database can be used to download one or more data blocks. Until the local, partial instance of the database is downloaded, the remote server can continue to fulfill any query requests.

A user interface can receive, from a user, an initial command, such as to perform a search according to search criteria. For example, a user can be browsing a website with information about used cars, and the initial command can be to search for all cars of a particular make and model. As part of a first interaction 411, the initial command received through the user interface can be processed by the client to generate a query. In some embodiments, the requests can be formatted as a JSON post.

As part of interaction 413, the client can send the query with request indicating that a variable includeBootstrap=true to a remote server, and the remote server can receive the query request indicating includeBootstrap=true. The variable includeBootstrap can be used by the remote server as an indication of a request by the client to receive a meta-database that indicates how a database is structured. The meta-database can indicate, for example, which fields are partitioned according to a partition scheme, which blocks form a partition, etc. The variable includeBootstrap can also serve as an indication of a request by the client to receive a partition of the database from the remote server. In various implementations, the includeBootstrap can be renamed as any other variable name, implemented as a separate function, or implemented in a separate interaction. While the client receives the partition(s) of the database, the client can continue to use the remote server to execute queries.

The remote server can execute the query against the database and determine results to the query. In response to the query, as part of interaction 415, the remote server can transmit results and/or a results page. For example, the remote server can find all data about the particular make and model of car sought by the user, and transmit a web page back listing at least some of the results. As part of interaction 417, the client can render the results in the user interface.

As part of interaction 415 (or in some embodiments in a separate interaction), data set information can also be included with the response sent to the client in response to the request to include bootstrapping. The client receives the results and data set information.

The data set information can be used to permit the client to begin downloading (either in the background, or on-demand) larger subsets of the server's database on its own cognizance, and not necessarily from the server. For example, the client can download from a CDN. There can be two logical databases on the client at any time: the data blocks which can be a consistent subset of the server's full database, and the data set information which can be meta-data or a meta-database that describes a consistent subset of the server's full database and/or can also be a consistent superset of the client's data blocks.

The client can then initialize a search context 419 to build up a local database so that local searches can be performed. Until the local database is sufficiently built, searches can continue to be performed by querying the remote server.

In interaction 421, the client can initialize and request data block downloads from the remote server. The remote server can respond with interaction 423 by transmitting one or more data blocks to the client, and the client can receive the first set of data blocks from the remote server. The data block downloads can occur a plurality of times. The data block downloads can occur while the user is otherwise engaged in an activity besides waiting for a query. For example, the data block downloads can occur while the user is viewing the rendered results or selecting additional filters for generating a next query. Examples of data blocks 305 and 355 are shown in FIG. 3.

In interaction 425, the user interface can receive, from the user, a second command, such as to perform a narrowing search or for a second page of results from the initial search. The second command can be processed by the client to generate a second query. In interaction 427, the client can send the second query to the remote server, and the remote server can receive the second query. The second query (or other function) can indicate that includeBootstrap (or other variable) is false to indicate that no new or separate partition of the database is requested based on the second query since a partition based on the initial query is still being transmitted.

The server can execute the second query. While results of the second query are being prepared, the remote server can continue to send one or more data blocks to the client, and the client can receive the one or more data blocks from the server in interaction 429. When the response to the second query is prepared, the remote server can send results and/or a results page to the client in interaction 431. The client can receive the results page from the remote server, and the client can cause the results page to be rendered in the user interface in interaction 433.

In interaction 435, the remote server can send a last data block to the client, and the client can receive the last data block from the remote computer. The last data block can be the last data block for the client to complete or decode a relevant partition of the database.

In interaction 437, the user interface can receive, from the user, a third command, such as to perform another narrowing search or to retrieve another page of results. In activity 439, the second command can be processed by the client and the query can be performed by the client on the partition of the database stored in the memory or other storage of the client. A query result page can be determined by the client, and the client can cause the query result page to be rendered in the user interface in interaction 441.

Subsequent queries for information about the partition of the database stored in the memory of the client can be locally performed by the client as shown in activity 439. In response to further queries, a client can determine if data for executing the query is locally available. If so, then the client can execute the query. If not, then the client can attempt to fetch the blocks from the remote server.

In interaction 443, a user may provide a query that seeks information beyond what is available in the data blocks received by the client. In response to receiving a command querying partitions of the database not stored in the memory of the client, the command can be processed by the client to generate and send a query request to the remote server, and the remote server can receive the query request, and partitions of the flow described above can be repeated.

Example Sever Response to Query

Figure 5:
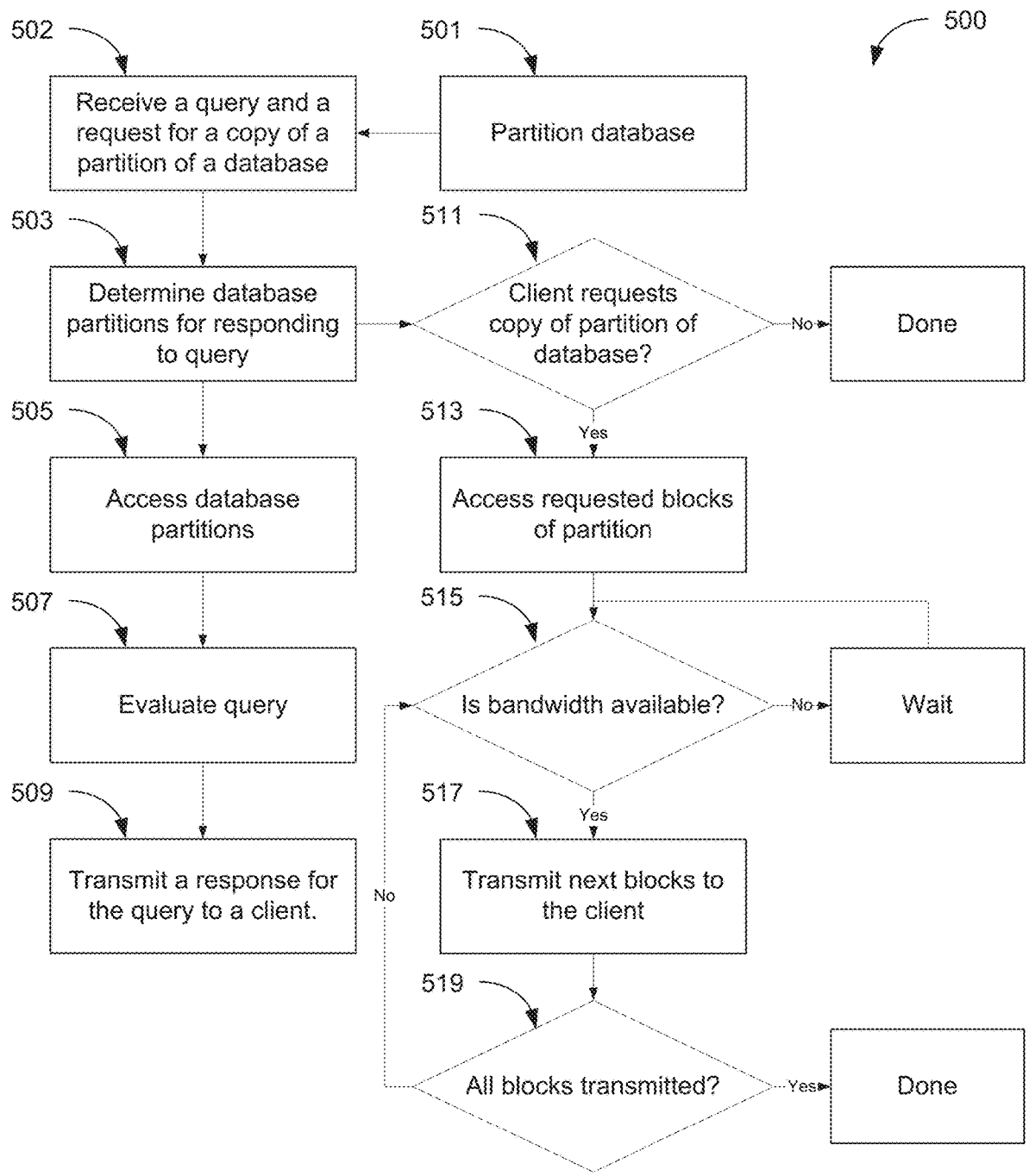
FIG. 5 shows an example block diagram for a server response to a query.

FIG. 5 shows an example block diagram 500 for a server response to a query.

At 501, the server can partition a database or otherwise divide the database into divisions that align with search criteria. For example, if users commonly filter based on certain categories such as price, location, etc., then the database can be divided or partitioned based on those categories. The columns of a database can correspond to the partition scheme.

At 502, the server can receive a query and an indication of a request for a copy of a partition of a database.

At 503, the server can determine which partitions of the database to access to respond to the query. For example, for a database of used cars, a query may search for used cars of a particular make, model, and price bracket. The server can determine if the database is partitioned based on any of those query parameters (make, model, and price bracket), and if so, select one of those partitions to access. For example, if the database is a columnar database and separately partitioned by make, model, and price bracket, then the server can select whichever partition is the smallest.

At 505, the server can access the partition.

At 507, the server can evaluate the query against the records in the partition.

At 509, the server can transmit a response for the query to a client.

At 511, the server can also determine whether or not the client has requested a copy of a partition of the database. The client may request a partition of the database, such as a block, partition, or other partition at block 607 of FIG. 6. For example, the client may do so by setting a value of a variable such as includeBootstrap or otherwise provide an indication through another function.

If so, then at 513, the server can access blocks of the partitions that will be transmitted to the client. The server can be informed at block 502 about which partitions of the database to send to the client.

At 515, the server can determine if bandwidth is available for block transmission. For example, if the response is being transmitted at 509, then the server can wait before transmitting blocks of a partition. It should be understood that in some embodiments, some or all partitions of FIG. 5 can be fulfilled by edge-caches on behalf of the server. For example, the requested partitions of the database can be transmitted by edge-caches.

At 517, the server can transmit one or more blocks to the client. The blocks can be one of a plurality of blocks determined in 513. The next blocks can include different fields.

At 519, the server can determine if all blocks determined at 513 have been transmitted. If not, then 515, 517, and 519 can repeat until all blocks are transmitted.

Example Client Query Generation and Execution

Figure 6:
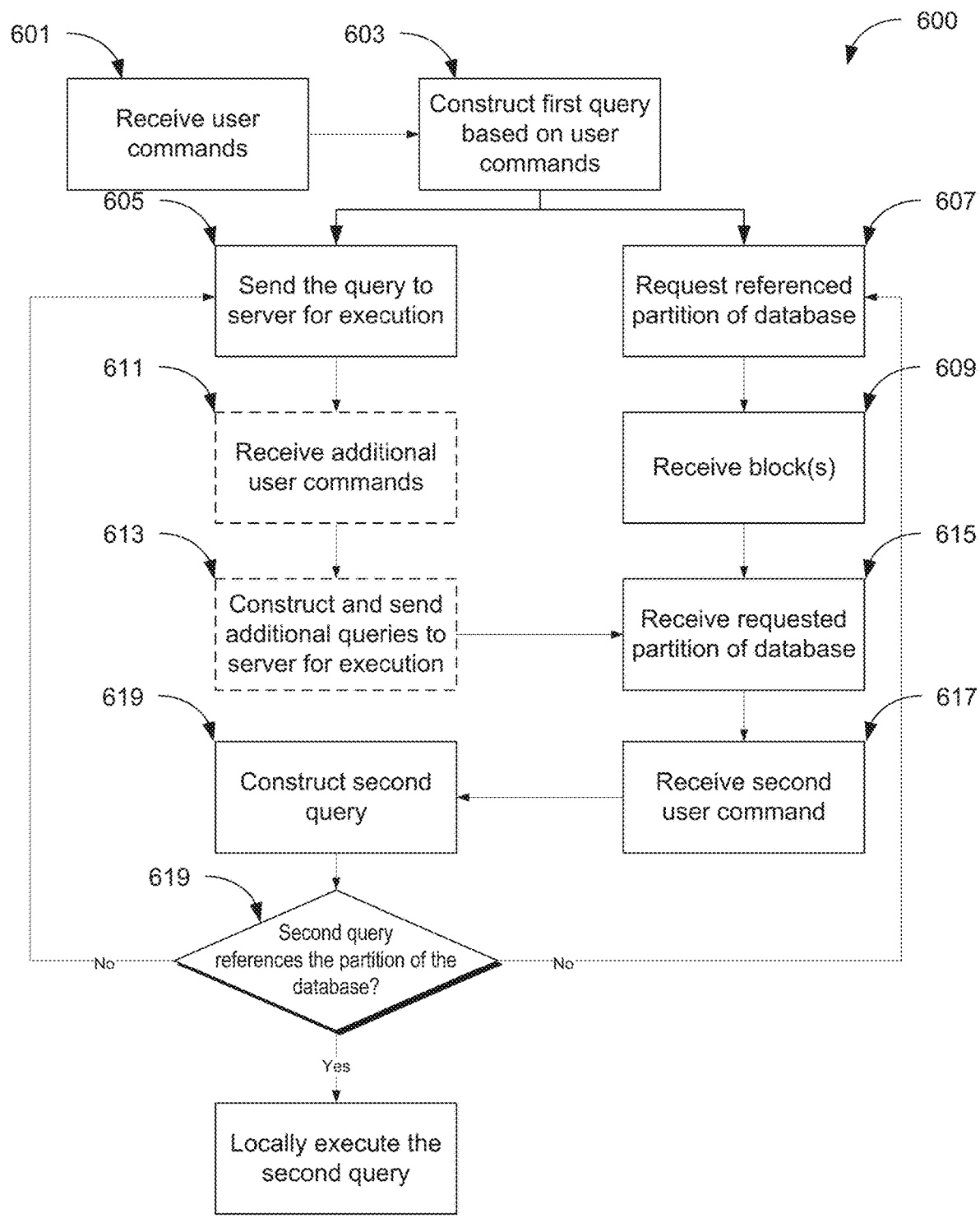
FIG. 6 shows an example block diagram for a client to execute queries.

FIG. 6 shows an example block diagram 600 for a client to execute queries.

Figure 7:
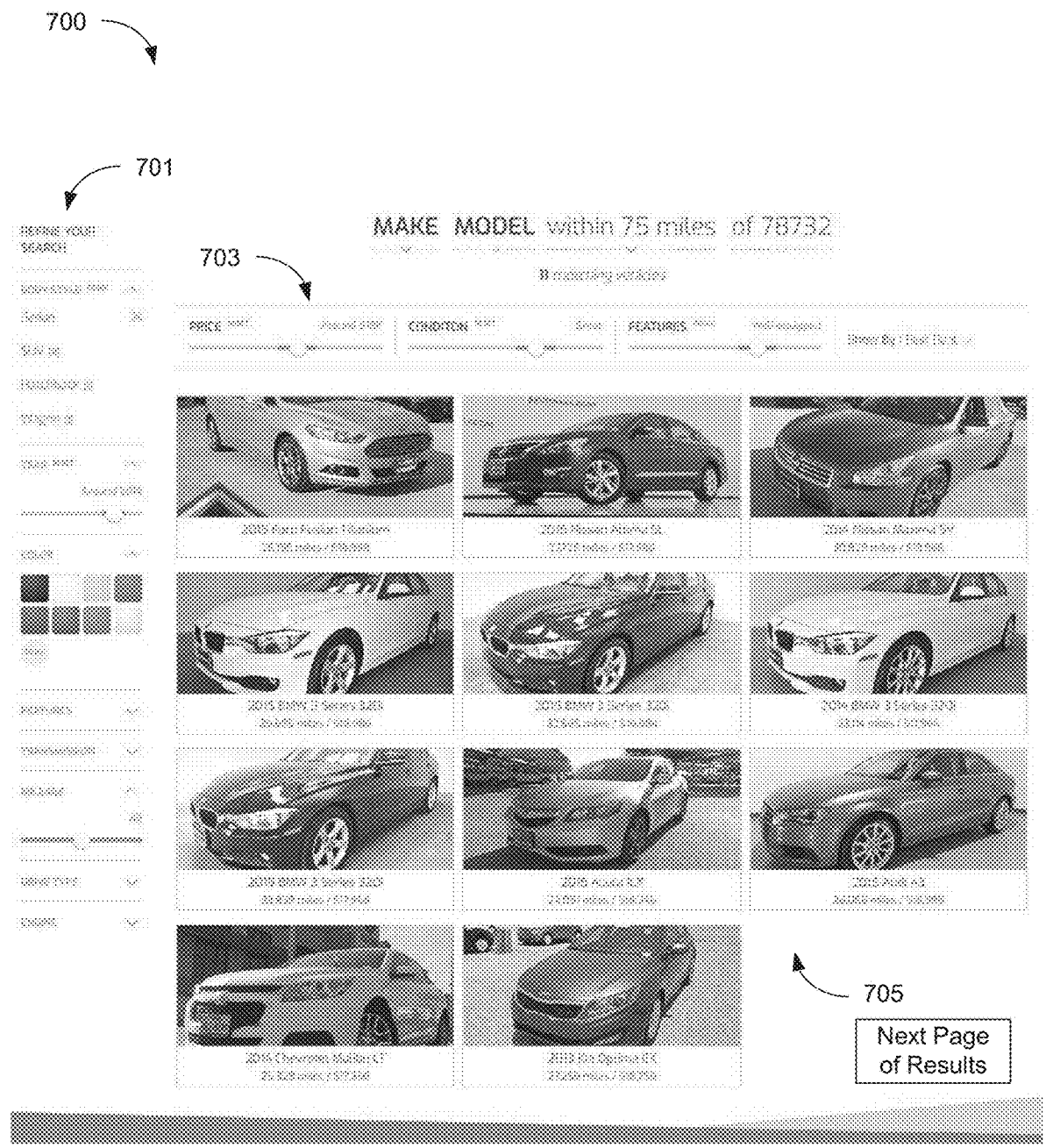
FIG. 7 shows an example user interface.

At 601, a client system can receive user commands, such as user inputs through input devices. The user commands can, for example, select filter or query criteria such as shown in FIG. 7.

At 603, the client system can construct a first query based on the user commands. The query can be, for example, a JSON query generated based on filter criteria selected by a user.

At 605, the client system can send the first query to a remote server for execution. Upon receiving a result of the query from the remote server, the client can generate a display of the result.

At 607, the client system can also request, from the remote server, a partition of the databased referenced in the query. For example, the client system can set a variable or send an instruction to indicate the request. Either the client or the server can determine an appropriate partition of the database based on at least part of the first query. In some embodiments, the client system can receive a meta-database and reference the meta-database to determine which blocks or partition of the remote database to download in order to complete the first (or subsequent) query. The client system can transmit the determined blocks or partition to the remote database, and the remote database may respond as described at block 511 of FIG. 5. The appropriate partition can be a subset of the database divided according to a partition scheme. For example, a first query for cars within 25 miles of a city under a certain price range can be sent to a remote server hosting a database about used cars for sale. If the database is partitioned by both geography and price, then the appropriate division could be a partition including data about cars satisfying at least the price filter, a partition including data about cars satisfying at least the geographic filter, or a partition satisfying both the price and geographic filters.

At 609, the client system can receive blocks that form the requested partition of the database.

Before the client system receives sufficient blocks to locally store the partition of the database, the client system may receive additional user commands at 611. Based on those commands, the client system can construct and send additional queries to the remote server for the remote server to execute at 613. The client system can display the results of those queries when the results are received from the remote server.

At 615, the client system can receive enough blocks such that the requested partition of the database is locally available to the client system. The partition of the database can be assembled using the blocks. The blocks can be decoded, decompressed, and/or unpacked to arrange the partition of the database. In some embodiments, the partition of the local database can include records that match records in a partition of the remote database. In some embodiments, the partition of the database can be arranged or constructed as a local database that is a copy of the column of the remote database, or arranged or constructed as any other data structure.

At 617, the client system can receive a second user command.

At 619, the client system can construct a second query based on the second user command.

At 619, if the second query can be executed by referencing the partition of the database locally available to the client, then at 621, the client can locally execute the second query. If at 619, the second query seeks information beyond what is included in the partition of the database locally available to the client, then the second query can be sent to the remote server for execute, and a new partition of the database can be requested. Any new blocks of data or partitions of the database can be locally aggregated with previously received blocks or partitions for use by future queries.

Example User Interface

FIG. 7 shows an example user interface 700 for searching for cars using a website configured to interface with systems as disclosed herein. The user interface can provide selectable filters 701 for particular properties of cars, such as a body style, year range, price range, colors, features, transmission, mileage range, miles per gallon, drivetrain type, engine size, location, etc. Some properties can be selected through fuzzy sliders 703. Results based on the filters can be shown in a display area 705. Although the example website is for searching for cars, the techniques disclosed herein can also be used with websites that list and filter anything, including houses, goods, services, information, other types of inventory items, and/or the like.

Users may initially perform a search using basic criteria, such as a body style, location, and price range. Based on the user's selected filters, an initial query can be generated by a client and sent to a remote server. It may take several tenths of milliseconds to several seconds, or longer, for the client to receive a response to the query and to display the results of the search. This can be due to connection latency, transfer time, backbone latency, or application latency, such as shown in FIG. 1 and FIG. 2, as well as the size of the response being received.

If a partition or other subset of the database is also sent a client, then subsequent queries can be natively performed by the client, without connection latency, transfer times, backbone latency, or application latency. Subsequently queries on the same subset of the database, such narrowing searches or to see a "next results" page, can consistently be performed much faster.

In some embodiments, the results of additional narrowing or changed search filters can be displayed with delay unperceivable to the naked eye. For example, a user may drag the price slider 703, and the results 705 can update as quickly the user drags the slider without visually perceivable delay. Likewise, a selection of a particular color, mileage range, or other filter criteria can similarly cause the results to be updated without visually perceivable delay, even if the full database on the remote server has hundreds of thousands or millions of entries of cars records, or more. The results can also update without refreshing the entire user interface 700. For example, when a user drags a slider, the results 705 can refresh or update without refreshing the entire user interface 700. The user interface 700 can provide a faster and more responsive user experience than websites that reload the website or re-query a remote server when subsequent queries are run.

In response to a user dragging a slider 703 or updating a filter 701, the results 705 can be quickly updated with unperceivable delay by natively executing a new query on a local copy of a partition. As shown in FIGS. 1A and 1B, natively executed queries have a median response time of about 3 ms. In some embodiments, the results 705 can be updated by executing a new query on a local copy of the partition as a user incrementally or continuously moves the slider 703 incrementally moves. In some embodiments, the results 705 can be updated by executing a new query on a local copy of the partition whenever a user moves and (at least briefly) pauses the slider 703 on a new value. In some embodiments, the results 705 can be updated by transmitting a query to the server for any new, missing, or updated data whenever the slider 703 is deactivated (e.g., released or paused) on a new value to avoid sending too many queries during a continuous movement of the slider 703.

In some embodiments, placeholders for the pictures can be displayed with unperceivable delay. For example, a user may update a search, and the results 705 can be refreshed to display updated results. In some cases, the updated results may require missing data such as missing pictures that have not yet been transmitted from a remote server to the client. If a client does not have the pictures locally cached, then the client can send a supplemental query or request to the remote database to retrieve the pictures (or other missing data), and the client can display the pictures as soon as the pictures are received by the client. Prior to receiving all of the missing data or missing pictures from the server, the results 705 can be updated at least partially with locally cached results and include placeholders, such as outlines or a default image, for the missing data or missing pictures, and the results 705 can be updated to replace the outlines or default images with the pictures as soon as the pictures are received from the server. In some embodiments, locally cached pictures can be displayed with unperceivable delay. This concept does not only apply to pictures, but can be used in any situation where some data items, such as text numbers, and/or the like take up relatively small amounts of storage as compared to pictures, videos, other multimedia-type files, and/or the like. In some embodiments, the system can be configured to store in the database at the local client at least a minimum amount of data sufficient to conduct a query that provides a result set, such as a subset of used cars or other items in the database. This result set may be generated in less time than it would take to receive a response from the remote server, and can enable the local user interface to quickly display at least a partition of the result set, or at least some information relating to the result set. For example, the user interface may be able to quickly update to show the user how many items are in the new result set (e.g., "11 matching vehicles"), a name or type of a plurality of items in the result set (e.g., a make, model, and year of a vehicle), one or more attributes related to a plurality of items in the result set (e.g., a mileage or price of a vehicle), and/or the like. The client system can be configured to concurrently or subsequently request the more data heavy items, such as pictures, videos, or other multimedia-type files from the remote server. Once these larger data items are received, the client can be configured to update or supplement the displaying of the result set with the larger data items. Such a configuration can be desirable, because, among other things, it can allow for a user interface that responds faster and has less lag than past systems. Further, such a configuration can allow a local client to store information in its local database related to a much larger number of items in a limited amount of storage than if the local database stored the larger data items for every single item in the local database. By having a larger pool of items stored in the local database, this increases the chances that a new or updated query entered by the user will be able to be quickly handled by the local client system to display at least some information about the result set, instead of having to wait for a response from the remote server before displaying any information about the result set.

In some embodiments, some filter criteria can be fuzzy filters, and queries implementing fuzzy logic can be generated based on fuzzy filters selected by a user. For example, the sliders 703 show a price range of "Around $18k" and in "Great" condition. When the query is executed, the results may include cars that are about $18k in great condition, above $18k in even better condition, and less than $18k if slightly below great condition. The fuzzy filters can be implemented for example, by tracking a deviation from a target value, wherein results can be included so long as the cumulative deviation from target values is within a threshold. Furthermore, some deviations for one filter criteria (e.g., a high price) can be offset by deviations in other filter criteria (e.g., a better condition).

Query Execution Techniques

User can perform various types of queries on a database, such as to filter data, sort data, and compute statistics. For example, a user may query a database of used cars to search for cars that match a particular make and model. As another example, the user may sort the results of the filtered data by ascending price. As another example, a client may compute an average, median, range, and mode for the price of the make and model of the cars that have sold within the past 30 days for displaying to the user.

Filter operations can include membership or intersection of values. The filter operations can range match integer, float, long, or string fields. Filters can also be used to find distances from a point. Any filter operation can be negated, and disjunction or conjunction of any filter operations can be performed.

Sort operations can be raw sorts or quantized sorts. For example, a quantized sort can be to list matching cars for sale located within increasing 5 mile intervals. Sort operations can be used to find similarity based on a calculated deviation score or from data provided by other references. Sort operations can also be used to naturally or case-insensitively sort most fields. Sort operations an also be used to page or index fields. Sort operations can be combined with each other and with filter operations in any order.

Various statistics can be computed. The user can compute statistics for a group of records. For example, a database may include information about multiple types of used cars, but a user may want to query the database to determine an average selling price for a particular 2015-2016 make and model vehicle with specific features. The statistics can be computed for that group of vehicles. Grouping can be based on any field in the database and can include ranges of values, unique values, parameterized dynamic ranges of integer fields, or any combination thereof. Statistic operations can include counting, finding a maximum, finding a minimum, finding quantiles, calculating averages, calculating medians, calculating ranges, calculating modes, etc. A user interface can show data grouped by city, county, state, price, mpg, mileage, vehicle type, or any other driver of demand. Statistic operations can be combined with sort and filter operations in any order, and any number of statistic operations can be computed for each query.

Various techniques can be used to execute queries. In response to a JavaScript Object Notation (JSON) query, the JSON query can be parsed to an Abstract Syntax Tree (AST) and validated for syntax or data errors. In some embodiments, other formats besides JSON can be used. For example, binary exchange formats can be used for some user interfaces on mobile devices with iOS or Android, or in a data center. Filter clauses can be compared to partitions schemes to determine if a partition of the database is available. The AST can be converted to an execution tree and invoked. Filters can be evaluated, page results computed and serialized to JSON, and status can be computed and serialized to JSON.

Logical filters can be performed in leaf order. Some logical steps can be short-circuited, otherwise, a cache can be consulted for each partition. For missing partitions, filters can be evaluated against relevant column(s). The result bitset can be saved against the partition, and a cache can be updated. For each branch, a new bitset can be constructed by linearly merging all child bitsets. Filters can be evaluated using any number of other techniques as well.

Filters can be efficiently performed using templated, inline-heavy, batch-wise execution. Instruction level parallelism can be used, minimizing dynamic invocation and front-end stalls. Fields can be coerced to Int while maintaining an order of underlying data. Clauses can become Int comparisons or dense bitset lookups. Clauses affecting normalized row fields can be merged to a single clause on the row id Int column.

For each partition/clause pair, the result can be cached. Modified queries can be completed by evaluating new clause and partitions. Uncached pages can be sorted without additional processing. Multiple, slightly different queries can be maintained with little overhead, permitting efficient processing of "what if" queries. The outcome of the "what if" queries can be indicated on the user interface to inform users about the outcomes of other possible actions and filtering.

Sorting can be expensive, as sorting algorithms can touch all matching records. Sorting can be optimized to improve performance. Most fields can be projected onto an Int that maintains total order. A fast-path comparison can be performed for Int, avoiding dynamic-dispatch. Per-record evaluations of sort clauses can be deferred until the total order requests it. Locality can be improved with sort-local storage. Data items can be mapped onto a byte-order comparable representation, and sortable partitions of a record can be encoded as a sequence of bytes that can be naturally compared. Materializing some sort-criteria can be deferred until less computationally expensive sorts and filters are performed first.

On executing, filtering steps can be short-circuited if a page is cached. Adjacent pages can be computed alongside user-requested pages and cached so that the next few page turns can be very fast.

Statistics (e.g., a median, quartile, groups, min, count, bands) can be costly to compute, as statistics can include scanning through results while maintaining a complex state. An AST can be built, and the evaluation can be rearranged, shared, and/or optimized. Shared and/or intermediate structures can be evaluated. Outputs can be produced with user-defined sorts, limits, and labeling. In rearranging an AST, expressions can be merged with same group-by clauses, fields of normalized rows can be replaced with ids, fields can be coerced to a compressed integer column, calculations from other calculations can be redirected, and optimal evaluation mechanisms can be configured. For example, there can be different templates for specialized expression evaluators for direct evaluators over fields coercible to a compressed Int, for buffered evaluators that are not coercible to a compressed Int, and for properties or Boolean evaluators.

Histograms can be computationally expensive to produce, given non-locality of memory access. Templates of specialized expression evaluators for histograms can include: for small, dense domains of a known size (e.g., dictionary values), a collection of dense counters of sufficient size; for domains sparser than result count, a simple sparse collection of counters; for larger result sets over sparser domains with a long tail, tiny (e.g., 4 bit) dense counters for a first N (e.g., 256k) values, where the sparse counters can be updated upon overflow or out-of-range values. The size of the first N values can be dynamically sized to fit in an L1 of a CPU cache of the computing system.

Invariant statistics can be cached, and whole-query results can be cached. In some embodiments, partial or intermediate statistic states can also be cached to permit efficient computing statistics to be calculated from the partial or intermediate statistic states. Invariant results can also be used to more efficiently compute statistics by computing statistics for add, removed, or changed records from a prior query without re-computing the invariant partition. Whenever a result of a filter operation is cached and a subsequent query includes the filter operation, then the filter result can be retrieved from the cache instead of performing the filter operation again.

In some examples, the optimizations and specializations can be used to compute dozens of sets of statistics over an entire inventory database including over ten million sparse bitsets in just 300 ms, which is about five times faster than a Solr based approach. The dozens of sets of statistics can be the equivalent of two dozen SQL queries containing a group-by clause.

Data Formats

An indexer can prepare an interleaved value file, which can include interleaved segments of value streams representing values of fields for records. Each field can have one or more data streams and a dictionary stream for uniquely encountered values. Streams can be provided to a buffer of a fixed size (such as 4 kB, 16 kB, or any other size) and can be drained to an output file when the buffer is full, along with an identifier of the stream.

Figure 8:
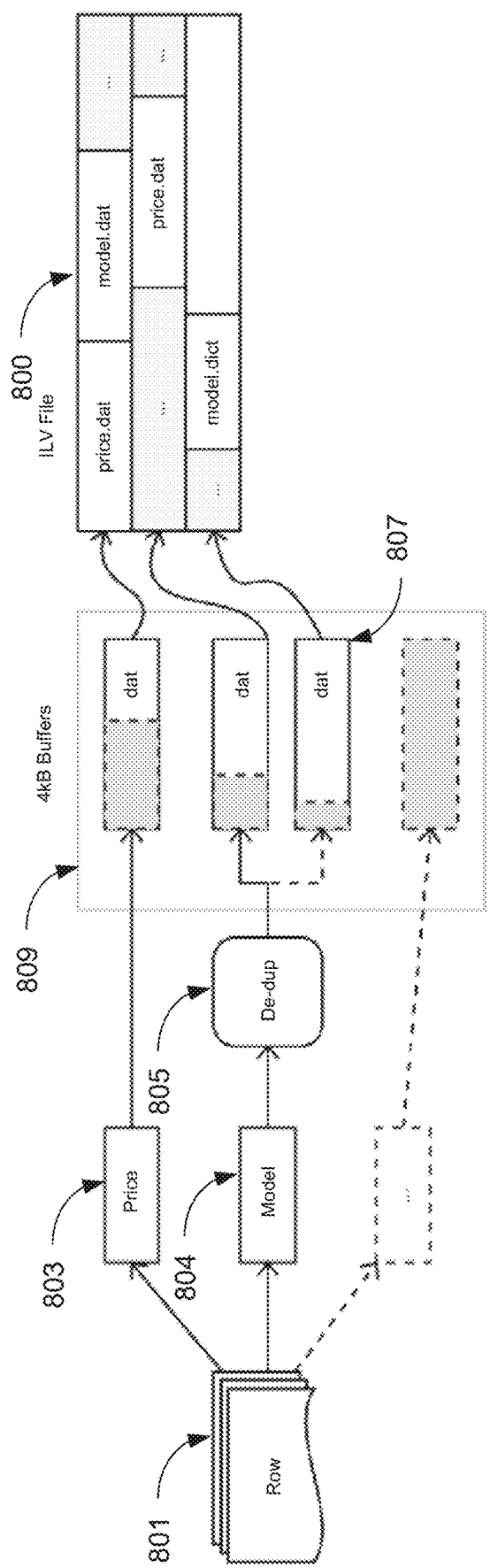
FIG. 8 shows an example diagram of an interleaved value file format.

FIG. 8 shows an example of an interleaved value file format 800. Row data 801 from records of a database can be separated by respective fields 803, 804. Fields with duplicate values can go through a deduplication processes to encode duplicate or unique values in a dictionary. Field data is streamed to buffers 809. When a buffer for a field or dictionary for a field is full, the buffer can be drained to an output interleaved value file 800. The output interleaved value file 800 can include interleaved data for a plurality of fields, as well as dictionaries for decoding.

Figure 9:
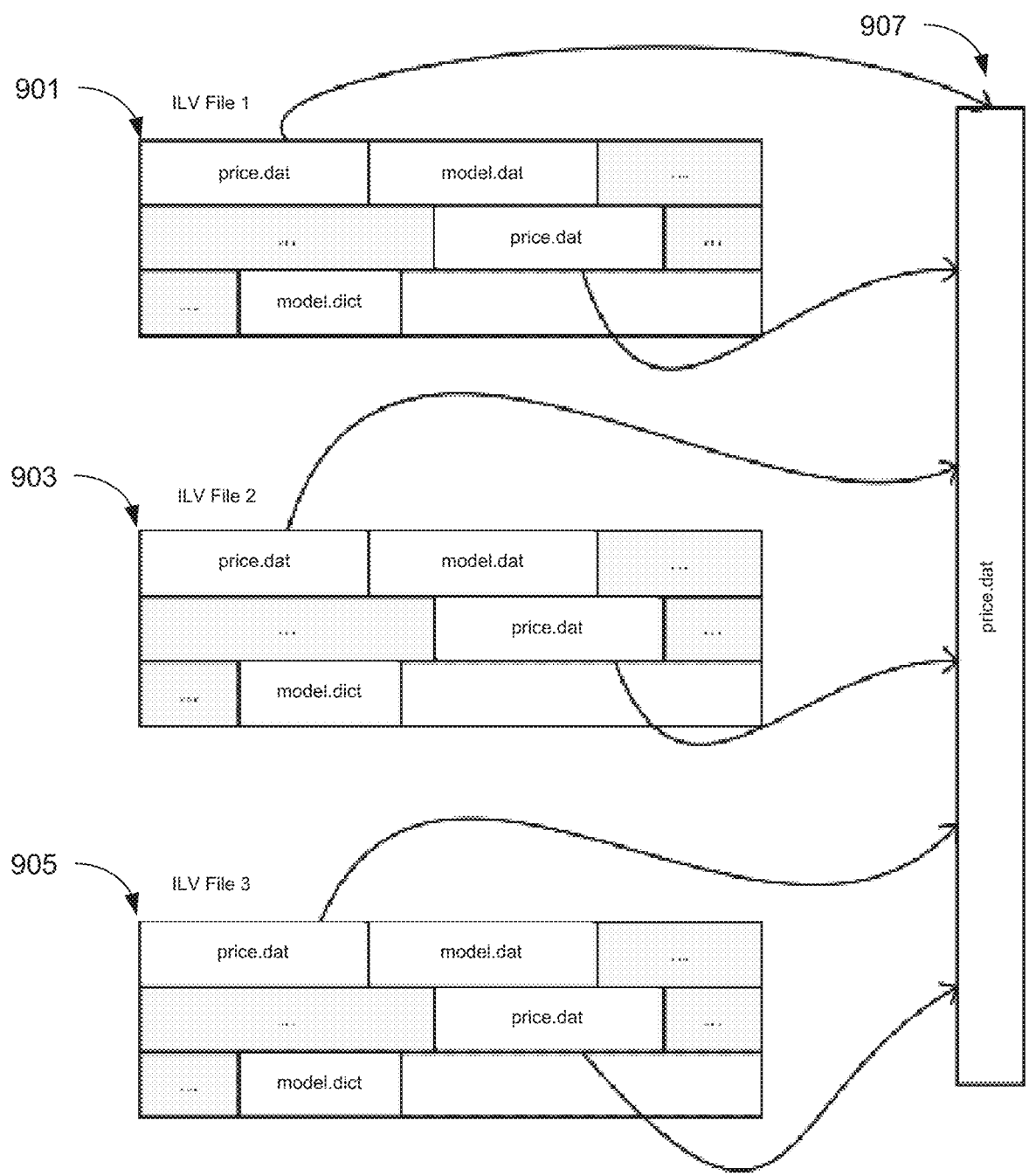
FIG. 9 shows an example block diagram for processing an interleaved value file.

FIG. 9 shows fields of ILV files 901, 903, and 905 being concatenated. Based on the identifiers, the fields from one or more ILV files can be concatenated to form a directory 907 for each field. The directory can be a single file for each field, and the dictionaries can be normalized.

Each stream can correspond to a column of a columnar database. The column can encode data as sparse bitsets. Some columns can include property sets (such as multi-value strings), as a collection of sparse bitsets. Some data (such as a make, model, and mpg) can be formatted as a single dictionary-encoded tuple. Some data can be formatted as integers, longs, floats, strings, and can be raw or dictionary encoded. An in-memory index of columns can be built to cover an inventory.

Example Computer System

Figure 10:
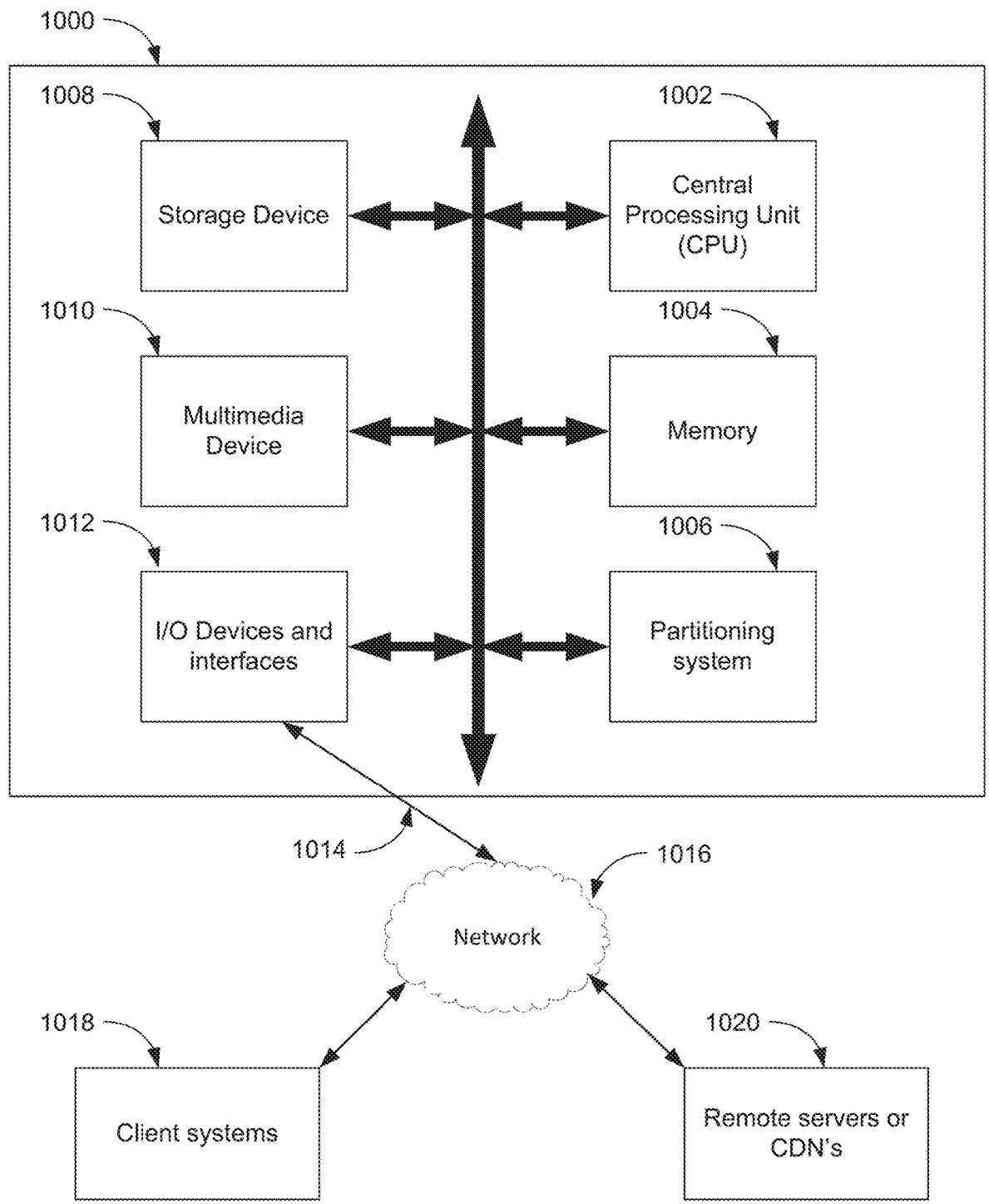
FIG. 10 shows an example computer hardware system.

FIG. 10 is a block diagram showing an example computer hardware system 1000 configured to run software for implementing one or more embodiments of the remote servers or CDN's. The server or CDN can communicate with one or more client computers systems 1018 or other servers and CDN's 2010 via one or more networks 1016 through a network connection 1114.

The computer hardware system 1000 can include a central processing unit (CPU) 1002, memory 1004 such as random access memory, a partitioning system 1006, storage devices 1008, multimedia devices 1010, and input/output devices and interfaces 1012. The partitioning system 1006 can be configured to partition data in the storage devices 1008 as discussed herein, such as storing a columnar database on the storage devices 1008 by partitioning data in the database according to columns.

In some embodiments, the computing system 1000 also comprises a mainframe computer suitable for controlling and/or communicating with large databases, performing high volume transaction processing, and generating reports from large databases. The computing system 1000 also comprises a central processing unit ("CPU") 1002, which may comprise a conventional microprocessor. The computing system 1000 further comprises a memory 1004, such as random access memory ("RAM") for temporary storage of information and/or a read only memory ("ROM") for permanent storage of information, and a mass storage device 1008, such as a hard drive, diskette, or optical media storage device. Typically, the modules of the computing system 1000 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The computing system 1000 comprises one or more commonly available input/output (I/O) devices and interfaces 1012, such as a keyboard, mouse, touchpad, and printer. In one embodiment, the I/O devices and interfaces 1012 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 1012 comprise a microphone and/or motion sensor that allow a user to generate input to the computing system 1000 using sounds, voice, motion, gestures, or the like. In the embodiment of FIG. 10, the I/O devices and interfaces 1012 also provide a communications interface to various external devices. The computing system 1000 may also comprise one or more multimedia devices 1010, such as speakers, video cards, graphics accelerators, and microphones, for example.

The computing system 1000 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 1000 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 1000 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 10, the computing system 1000 is coupled to a network 1016, such as a LAN, WAN, or the Internet, for example, via a wired, wireless, or combination of wired and wireless, communication link 1014. The network 1016 communicates with various computing devices and/or other electronic devices via wired or wireless communication links. In the embodiment of FIG. 10, the network 1016 is communicating with one or more client systems 1018 and/or one or more remote servers or CDN's 1020.

Access to the partitioning system 1006 of the computer system 1000 by client systems 1018 and/or one or more remote servers or CDN's 1020 may be through a web-enabled user access point such as the client systems' 1018 and/or one or more remote servers' or CDN's 1020 personal computer, cellular phone, smartphone, laptop, tablet computer, e-reader device, audio player, or other device capable of connecting to the network 1016. Such a device may have a browser module that is implemented as a module that uses text, graphics, audio, video, and other media to present data and to allow interaction with data via the network 1016.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 1012 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1000 may comprise a physical or logical connection established between a remote microprocessor and a mainframe host computer for the express purpose of uploading, downloading, or viewing interactive data and databases on-line in real time. In some embodiments, terminal emulation software may be used on the microprocessor for participating in the micro-mainframe link.

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

In addition to the systems that are illustrated in FIG. 10, the network 1016 may communicate with other data sources or other computing devices. The computing system 1000 may also comprise one or more internal and/or external data sources. In some embodiments, one or more of the data repositories and the data sources may be implemented using a relational database, such as DB2, Sybase, Oracle, Code-Base and Microsoft® SQL Server as well as other types of databases such as, for example, a flat file database, an entity-relationship database, and object-oriented database, and/or a record-based database.

Additional Disclosure

In some embodiments, a client can begin downloading larger sets of data blocks on its own. This can help to pre-fetch data blocks so that the client can respond to additional queries. For example, a client can download geographically partitioned data blocks, and then download more data blocks to include areas in an expanding radius from an initial search point. This way, the client can be prepared to respond to queries about information including farther distances from the search point. In some embodiments, a client can acquire more data blocks based at least in part on interactions with a server. For example, a client can receive and be informed by the meta-database data set information and acquire additional blocks in response.

The principles and advantages described herein can be implemented in various apparatuses. Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The word "coupled" as generally used herein, refers to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list.

The words "and/or" is also intended to cover all of the following interpretations of the word: any of the items in the list, all of the items in the list, and any combination of the items in the list. The term "based on," as generally used herein, encompasses the following interpretations of the term: solely based on or based at least partly on. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The teachings of the embodiments provided herein can be applied to other systems, not necessarily the systems described above. The elements and acts of the various embodiments described above can be combined to provide further embodiments.

While certain embodiments have been described, these embodiments have been presented by way of example only, and are not intended to limit the scope of the disclosure. Indeed, the novel methods and systems described herein can be embodied in a variety of other forms. Furthermore, various omissions, substitutions and changes in the form of the methods and systems described herein can be made without departing from the spirit of the disclosure. The accompanying claims and their equivalents are intended to cover such forms or modifications as would fall within the scope and spirit of the disclosure.

What is claimed is:

1. A computer-implemented method for efficiently querying a partitioned columnar database, the computer-implemented method comprising:
   receiving, by a client system comprising a client storage device, a client output device, and one or more computer processors in communication with the client storage device and the client output device, from a server system, a plurality of blocks of data, wherein the plurality of bocks of data comprise a subset of data associated with a cluster of records in a server partition of a partitioned columnar database of the server system;
   using, by the client system, the plurality of blocks of data to construct and store a local partition in the client storage device, wherein the local partition comprises a subset of data corresponding to some or all of the records of the cluster of records in the server partition;
   executing, by the client system, a first query against the local partition stored in the client storage device;
   determining, by the client system, that a complete result in response to the first query requires data not present in records of the local partition;
   transmitting, from the client system to the server system, a second query to be used against the server partition to return the data not present in the records of the local partition;
   prior to receiving a response to the second query, presenting, via the client output device, a partial result based on data present in the records of the local partition;
   receiving, by the client system from the server system, a response to the second query, the response to the second query comprising the data not present in the records of the local partition; and
   after receiving the response to the second query, presenting, via the client output device, the complete result, wherein the complete result is based on a combination of the data present in the records of the local partition and the data not present in the records of the local partition.

2. The computer-implemented method of claim 1, wherein the data not present in records of the local partition comprises data that is at least 10 times larger than the data stored in any field of the local partition.

3. The computer-implemented method of claim 1, wherein the data not present in records of the local partition comprises picture data.

4. The computer-implemented method of claim 1, wherein the data not present in records of the local partition comprises video data.

5. The computer-implemented method of claim 1, further comprising:
   determining, by the client system, that a new query is related to a separate cluster of records stored in a separate partition of the partitioned columnar database of the server system; and
   transmitting, from the client system to the sever system, the new query for execution against the separate partition.

6. The computer-implemented method of claim 5, further comprising:
   receiving, by the client system from the server system, a response to the new query, the response to the new query comprising sufficient data to present a complete result; and
   presenting, via the client output device, a complete result based on the response to the new query.

7. The computer-implemented method of claim 6, further comprising:
   receiving, by the client system from the server system, a second plurality of blocks of data, wherein the second plurality of blocks of data comprise a subset of data associated with the separate cluster of records; and
   using, by the client system, the second plurality of blocks of data to construct and store a second local partition in the client storage device, wherein the second local partition comprises a subset of data corresponding to some or all of the records of the separate cluster of records in the server partition, such that further new queries related to the separate cluster of records can be executed locally to generate at least partial results based on data present in records of the second local partition.

8. The computer-implemented method of claim 1, further comprising storing, by the server system in one or more server storage devices of the server system, the partitioned columnar database.

9. The computer-implemented method of claim 1, wherein the cluster of records in the server partition are associated with a plurality of inventory items.

10. The computer-implemented method of claim 9, wherein the plurality of inventory items comprises vehicles.

11. A computer readable, non-transitory storage medium having a computer program stored thereon for causing a suitably programmed computer system to process by one or more processors computer-program code by performing a method for efficiently querying a partitioned columnar database when the computer program is executed on the suitably programmed computer system, the method comprising:
receiving, by a client system comprising a client storage device, a client output device, and one or more computer processors in communication with the client storage device and the client output device, from a server system, a plurality of blocks of data, wherein the plurality of bocks of data comprise a subset of data associated with a cluster of records in a server partition of a partitioned columnar database of the server system;
using, by the client system, the plurality of blocks of data to construct and store a local partition in the client storage device, wherein the local partition comprises a subset of data corresponding to some or all of the records of the cluster of records in the server partition;
executing, by the client system, a first query against the local partition stored in the client storage device;
determining, by the client system, that a complete result in response to the first query requires data not present in records of the local partition;
transmitting, from the client system to the server system, a second query to be used against the server partition to return the data not present in the records of the local partition;
prior to receiving a response to the second query, presenting, via the client output device, a partial result based on data present in the records of the local partition;
receiving, by the client system from the server system, a response to the second query, the response to the second query comprising the data not present in the records of the local partition; and
after receiving the response to the second query, presenting, via the client output device, the complete result, wherein the complete result is based on a combination of the data present in the records of the local partition and the data not present in the records of the local partition.

12. The computer readable, non-transitory storage medium of claim 11, wherein the data not present in records of the local partition comprises data that is at least 10 times larger than the data stored in any field of the local partition.

13. The computer readable, non-transitory storage medium of claim 11, wherein the data not present in records of the local partition comprises picture data.

14. The computer readable, non-transitory storage medium of claim 11, wherein the data not present in records of the local partition comprises video data.

15. The computer readable, non-transitory storage medium of claim 11, the method further comprising:
determining, by the client system, that a new query is related to a separate cluster of records stored in a separate partition of the partitioned columnar database of the server system; and
transmitting, from the client system to the sever system, the new query for execution against the separate partition.

16. The computer readable, non-transitory storage medium of claim 15, the method further comprising:
receiving, by the client system from the server system, a response to the new query, the response to the new query comprising sufficient data to present a complete result; and
presenting, via the client output device, a complete result based on the response to the new query.

17. The computer readable, non-transitory storage medium of claim 16, the method further comprising:
receiving, by the client system from the server system, a second plurality of blocks of data, wherein the second plurality of blocks of data comprise a subset of data associated with the separate cluster of records; and
using, by the client system, the second plurality of blocks of data to construct and store a second local partition in the client storage device, wherein the second local partition comprises a subset of data corresponding to some or all of the records of the separate cluster of records in the server partition, such that further new queries related to the separate cluster of records can be executed locally to generate at least partial results based on data present in records of the second local partition.

18. The computer readable, non-transitory storage medium of claim 11, the method further comprising storing, by the server system in one or more server storage devices of the server system, the partitioned columnar database.

19. The computer readable, non-transitory storage medium of claim 11, wherein the cluster of records in the server partition are associated with a plurality of inventory items.

20. The computer readable, non-transitory storage medium of claim 19, wherein the plurality of inventory items comprises vehicles.

* * * * *